(12) United States Patent
Lee et al.

(10) Patent No.: US 10,103,580 B2
(45) Date of Patent: Oct. 16, 2018

(54) WIRELESS POWER TRANSMISSION APPARATUS AND METHOD

(71) Applicant: Samsung Electronics Co., Ltd., Suwon-si (KR)

(72) Inventors: Jaechun Lee, Seoul (KR); Sang Joon Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 184 days.

(21) Appl. No.: 15/155,747

(22) Filed: May 16, 2016

(65) Prior Publication Data

US 2017/0141614 A1    May 18, 2017

(30) Foreign Application Priority Data

Nov. 17, 2015    (KR) .................. 10-2015-0161041

(51) Int. Cl.
| | |
|---|---|
| *H02J 50/12* | (2016.01) |
| *H02J 50/90* | (2016.01) |
| *B60L 11/18* | (2006.01) |
| *H01F 38/14* | (2006.01) |
| *H04B 5/00* | (2006.01) |
| *H02J 50/40* | (2016.01) |

(52) U.S. Cl.
CPC ............ *H02J 50/12* (2016.02); *B60L 11/182* (2013.01); *H01F 38/14* (2013.01); *H02J 50/40* (2016.02); *H02J 50/90* (2016.02); *H04B 5/0037* (2013.01); *H04B 5/0087* (2013.01)

(58) Field of Classification Search
None
See application file for complete search history.

(56) References Cited

U.S. PATENT DOCUMENTS

| | | | |
|---|---|---|---|
| 8,800,738 B2 | 8/2014 | Urano | |
| 2009/0033280 A1* | 2/2009 | Choi | H02J 7/025 320/108 |
| 2010/0270970 A1* | 10/2010 | Toya | H02J 7/0027 320/108 |
| 2012/0049642 A1* | 3/2012 | Kim | H02J 5/005 307/104 |
| 2012/0299557 A1 | 11/2012 | Kwon et al. | |
| 2013/0015718 A1 | 1/2013 | Jung et al. | |

(Continued)

FOREIGN PATENT DOCUMENTS

| | | |
|---|---|---|
| KR | 10-0732177 B1 | 6/2007 |
| KR | 10-2012-0131015 A | 12/2012 |

(Continued)

OTHER PUBLICATIONS

Extended European Search Report dated Apr. 12, 2017 in counterpart European Application No. 16187943.2 (8 pages in English).

*Primary Examiner* — Jared Fureman
*Assistant Examiner* — Joel Barnett
(74) *Attorney, Agent, or Firm* — NSIP Law

(57) ABSTRACT

A wireless power transmission method includes operating at least one source resonator among a plurality of source resonators; detecting a waveform while the at least one source resonator resonates; determining, based on the detected waveform, a source resonator for wireless power transmission; and wirelessly transmitting power to a target resonator using the determined source resonator.

19 Claims, 19 Drawing Sheets

(56) References Cited

U.S. PATENT DOCUMENTS

| | | | |
|---|---|---|---|
| 2013/0214591 A1 | 8/2013 | Miller et al. | |
| 2013/0285462 A1 | 10/2013 | Kim et al. | |
| 2014/0015341 A1* | 1/2014 | Kagami | H02J 5/005 |
| | | | 307/104 |
| 2014/0091626 A1 | 4/2014 | Walley et al. | |
| 2014/0111475 A1 | 4/2014 | Bae | |
| 2014/0175895 A1 | 6/2014 | Ishi et al. | |
| 2015/0054347 A1 | 2/2015 | Amano | |
| 2015/0372495 A1* | 12/2015 | McCauley | H02J 5/005 |
| | | | 307/104 |
| 2016/0087450 A1* | 3/2016 | Takahashi | B60L 11/182 |
| | | | 307/104 |
| 2016/0233724 A1* | 8/2016 | Bae | H04B 5/0037 |

FOREIGN PATENT DOCUMENTS

| | | |
|---|---|---|
| KR | 10-2013-0106706 | 9/2013 |
| KR | 10-2014-0060866 A | 5/2014 |
| KR | 10-2014-0105333 A | 9/2014 |
| KR | 10-1473725 B1 | 12/2014 |

\* cited by examiner

WIRELESS POWER TRANSMISSION APPARATUS AND METHOD

CROSS-REFERENCE TO RELATED APPLICATIONS

This application claims the benefit under 35 USC 119(a) of Korean Patent Application No. 10-2015-0161041 filed on Nov. 17, 2015, in the Korean Intellectual Property Office, the entire disclosure of which is incorporated herein by reference for all purposes.

BACKGROUND

1. Field

The following description relates to a wireless power transmission apparatus and method.

2. Description of Related Art

Wireless power is energy that is transmitted from a wireless power transmission apparatus to a wireless power reception apparatus through magnetic coupling. A wireless power charging system includes a source device configured to wirelessly transmit power, and a target device configured to wirelessly receive power. The source device may be referred to as a wireless power transmission apparatus, and the target device may be referred to as a wireless power reception apparatus.

The source device includes a source resonator, and the target device includes a target resonator. Magnetic coupling or resonance coupling occurs between the source resonator and the target resonator.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a wireless power transmission method includes operating at least one source resonator among a plurality of source resonators; detecting a waveform while the at least one source resonator resonates; determining, based on the detected waveform, a source resonator for wireless power transmission; and wirelessly transmitting power to a target resonator using the determined source resonator.

The operating may include supplying power to the at least one source resonator during a first supply time; and disconnecting one end of the at least one source resonator in response to the first supply time having elapsed.

The supplying may include electrically connecting the at least one source resonator to a direct current (DC) source during the first supply time; and the disconnecting may include disconnecting an electrical connection between the at least one source resonator and the DC source in response to the first supply time having elapsed.

The detecting may include detecting an envelope of an electric signal produced by resonance occurring in the at least one source resonator during a detection time; and connecting both ends of the at least one source resonator to a ground in response to the detection time having elapsed.

The determining may include determining the source resonator for wireless power transmission based on an attenuation level of the detected waveform.

The wirelessly transmitting may include supplying power to the determined source resonator during a second supply time; disconnecting one end of the determined source resonator in response to the second supply time having elapsed; and connecting both ends of the determined source resonator to a ground in response to a transmission time having elapsed after a point in time at which the one end of the determined source resonator is disconnected.

The operating may include selecting the at least one source resonator from the plurality of source resonators according to a preset order, and operating the selected source resonator; and the detecting may include detecting waveforms for the plurality of source resonators in the preset order.

The plurality of source resonators may be arranged in a lattice pattern; and the selecting may include selecting a source resonator corresponding to a single row or a single column in the lattice pattern.

The plurality of source resonators may be classified into a plurality of groups; and the selecting may include selecting a source resonator corresponding to a single group among the plurality of groups.

In another general aspect, a non-transitory computer-readable storage medium stores instructions to cause computing hardware to perform the method described above.

In another general aspect, a wireless power transmission apparatus includes a plurality of source resonators; a switch configured to operate at least one source resonator among the plurality of source resonators by connecting the at least one source resonator to a power source; a detector configured to detect a waveform while the at least one source resonator resonates; and a switch controller configured to determine, based on the detected waveform, a source resonator for wireless power transmission, and control the switch to wirelessly transmit power to a target resonator using the determined source resonator.

The switch may include a first switch configured to selectively connect one end of each of source resonators connected together at the one end among the plurality of source resonators to the power source under control of the switch controller; and a second switch configured to selectively connect another end of each of source resonators connected together at the other end among the plurality of source resonators to a ground under control of the switch controller.

Each of the plurality of source resonators may include a capacitor; an inductor; and a diode configured to prevent power received by the source resonator from flowing to another one of the source resonators.

The plurality of source resonators may be arranged at intersection points at which a plurality of parallel first axes intersect a plurality of parallel second axes; and the switch may include a first switch configured to connect one end of each of source resonators arranged along a single first axis among the first axes to the power source, and a second switch configured to connect one end of each of source resonators arranged along a single second axis among the second axes to a ground.

Source resonators having one end connected together among the plurality of source resonators may be arranged in a zigzag pattern; and source resonators having another end connected together among the plurality of source resonators may be arranged in a line.

The switch controller may be further configured to control the switch to connect one end of the at least one source resonator to the power source during a first supply time, and disconnect the one end of the at least one source resonator from the power source in response to the first supply time having elapsed.

The detector may be further configured to detect, at one end of the at least one source resonator, an envelope of an electric signal produced by resonance occurring in the at least one source resonator during a detection time; and the switch controller may be further configured to control the switch to connect both ends of the at least one source resonator to a ground in response to the detection time having elapsed.

The switch controller may be further configured to determine, based on an attenuation level of the detected waveform, the source resonator for wireless power transmission.

The switch controller may be further configured to control the switch to connect one end of the determined source resonator to the power source during a second supply time, disconnect the one end of the determined source resonator from the power source in response to the second supply time having elapsed, and connect both ends of the determined source resonator to a ground in response to a transmission time having elapsed after a point in time at which the one end of the determined source resonator is disconnected from the power source.

The plurality of source resonators may be classified into a plurality of groups; and the switch controller may be further configured to sequentially select the plurality of groups, control the switch to operate source resonators corresponding to a selected group, and sequentially acquire waveforms for the plurality of source resonators.

In another general aspect, a wireless power transmission apparatus includes a plurality of source resonators; a switch connected to the source resonators; a detector configured to detect waveforms of the source resonators while the source resonators are resonating; and a switch controller configured to control the switch to cause the source resonators to resonate, determine which one of the source resonators is closest to a target resonator based on the detected waveforms, and control the switch to wirelessly transmit power from the determined source resonator to the target resonator.

The source resonators may be arranged in rows and columns; the switch may include a plurality of first switches respectively corresponding to the rows, each of the first switches being connected to a first end of all of the source resonators in a corresponding one of the rows, and a plurality of second switches respectively corresponding to the columns, each of the second switches being connected to a second end of each of the source resonators in a corresponding one of the columns; and the switch controller may be further configured to control the first switches and the second switches to cause the source resonators to resonate, and control the first switches and the second switches to wirelessly transmit power from the determined source resonator to the target resonator.

The rows may be straight rows, the columns may be straight columns, and the rows may intersect the columns at an angle of less than or equal to 90°.

The rows may be zigzag rows and the columns may be straight columns.

The switch controller may be further configured to control the first switches to connect the first end of each of the source resonators in all of the rows to a DC source and control the second switches to connect the second end of each of the source resonators in one of the columns to a ground and disconnect the second end of each of the source resonators in all remaining ones of the columns from the ground to charge all of the source resonators in the one column with DC power; control the first switches to disconnect the first end of each of the source resonators in all of the rows from the DC source to cause all of the source resonators in the one column to resonate; and repeat the controlling of the first switches and the second switches for each of the remaining column to charge all remaining ones of the source resonators with DC power and cause all remaining ones of the source resonators to resonate.

The rows may be classified into groups of nonadjacent rows; and the switch controller may be further configured to control the first switches to connect the first end of each of the source resonators in one of the groups of rows to a DC source and connect the first end of each of the source resonators in all remaining groups of the rows to a ground and control the second switches to connect the second end of each of the source resonators in one of the columns to the ground and disconnect the second end of each of the source resonators in all remaining ones of the columns from the ground to charge all of the source resonators in the one group of rows and the one column with DC power, control the first switches to disconnect the first end of each of the source resonators in the one group of rows from the DC source to cause all of the source resonators in the one group of rows and the one column to resonate, and repeat the controlling of the first switches and the second switches for each of the remaining columns and then for each of the remaining groups to charge all remaining ones of the source resonators with DC power and cause all remaining ones of the source resonators to resonate.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The terminology used herein is for the purpose of describing particular examples only, and is not to be used to limit the disclosure. As used herein, the terms "a," ", an," and "the" are intended to include the plural forms as well, unless the context clearly indicates otherwise. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Figure 1:
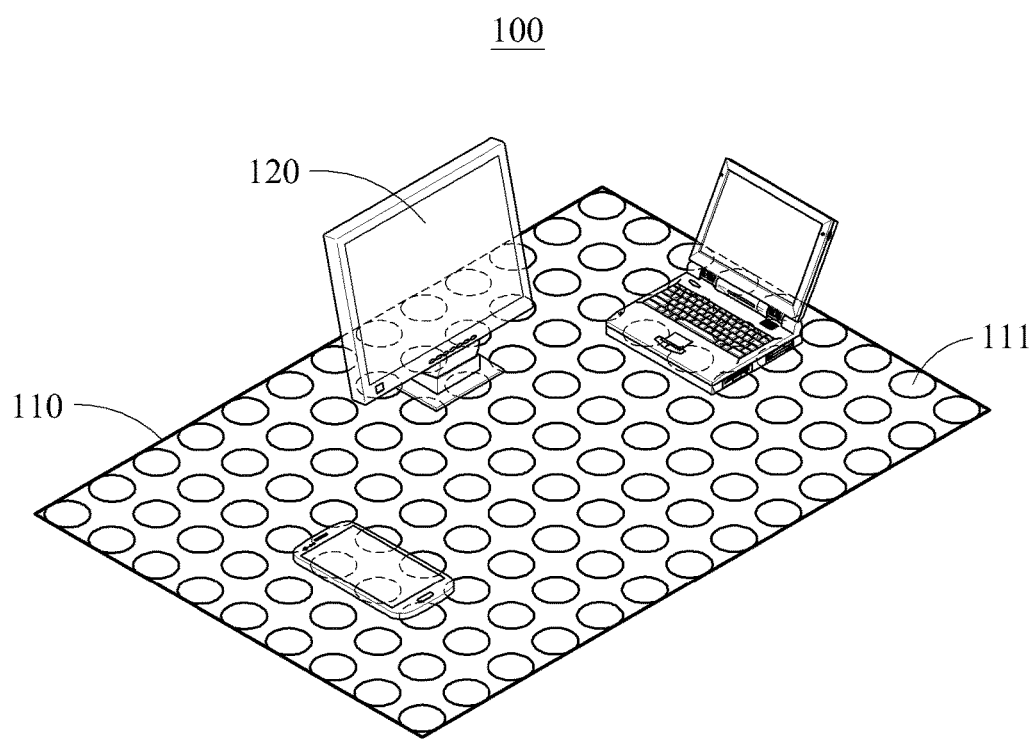
FIG. 1 illustrates an example of a wireless power transmission system.

FIG. 1 illustrates an example of a wireless power transmission system 100.

Referring to FIG. 1, the wireless power transmission system 100 includes a wireless power transmission apparatus 110 and a wireless power reception apparatus 120.

The wireless power transmission apparatus 110 wirelessly transmits power to the wireless power reception apparatus 120. For example, the wireless power transmission apparatus 110 wirelessly transmits power via resonance coupling between a source resonator 111 included in the wireless power transmission apparatus 110 and a target resonator (not shown) included in the wireless power reception apparatus 120. The wireless power transmission apparatus 110 includes a plurality of source resonators 111. The wireless power transmission apparatus 110 selects a source resonator 111 corresponding to a location of the wireless power reception apparatus 120 from the plurality of source resonators 111, and wirelessly transmits power from the selected source resonator 111 to the target resonator of the wireless power transmission apparatus 110. Also, the wireless power transmission apparatus 110 wirelessly transmits power to a plurality of wireless power reception apparatuses 120. The wireless power transmission apparatus 120 wirelessly supplies power to a device placed at an arbitrary location on a two-dimensional (2D) plane based on a 2D arrangement of source resonators. An operation of the wireless power transmission apparatus 110 will be further described with reference to FIGS. 2 through 20.

The wireless power reception apparatus 120 wirelessly receives power from the wireless power transmission apparatus 110. The wireless power reception apparatus 120 is an electronic device including a target resonator, and may be, for example, a portable device or a cordless stationary device. The portable device may be, for example, a mobile phone, a smartphone, a notebook personal computer (PC), a table PC, or a laptop PC, and the cordless stationary device may be, for example, a wireless display.

Figure 2:
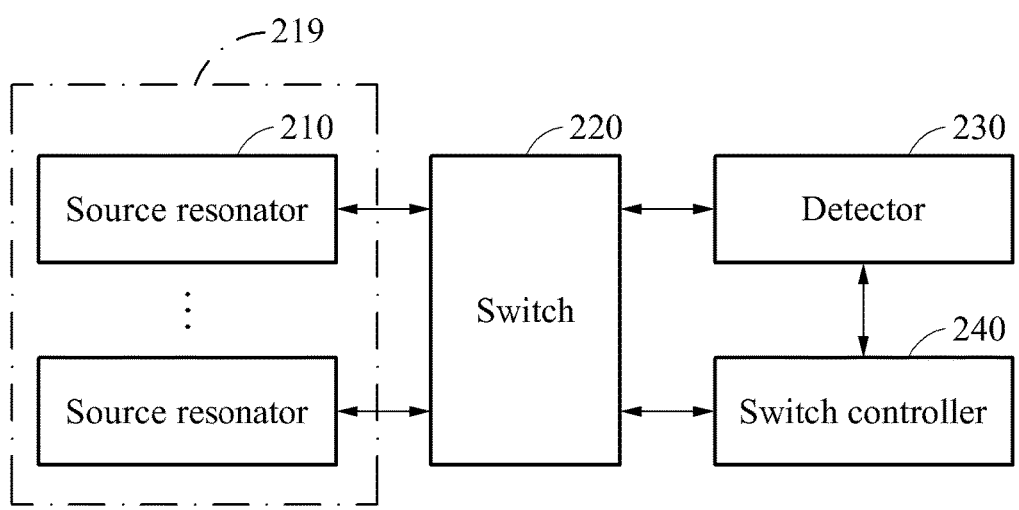
FIG. 2 illustrates an example of a configuration of a wireless power transmission apparatus.

FIG. 2 illustrates an example of a configuration of the wireless power transmission apparatus 110.

Referring to FIG. 2, the wireless power transmission apparatus 110 includes a source resonator 210, a switch 220, a detector 230, and a switch controller 240. The wireless power transmission apparatus 110 includes a plurality of source resonators 219 including the source resonator 210.

The source resonator 210 transmits power to a target resonator (not shown). The source resonator 210 transmits power supplied through the switch 220 to the target resonator via resonance coupling under control of the switch controller 240. A configuration of the source resonator 210 will be further described with reference to FIG. 3. Although in this application the plurality of source resonators 219 are arranged in a lattice pattern, this is merely an example, and a pattern in which the source resonators 219 are arranged may be changed depending on a design of the wireless power transmission apparatus 110.

The switch 220 connects at least one source resonator 210 among the plurality of source resonators 219 to a power source to operate the at least one source resonator 210. In this application, the expression "operate a resonator" refers to allowing a resonator to resonate. For example, under the control of the switch controller 240, the switch 220 connects the source resonator 210 to the power source during a predetermined period of time (for example, a first supply time or a second supply time), and disconnects one end of the source resonator 210 to operate the source resonator 210. The switch 220 connects and disconnects one end of the source resonator 210 to and from the power source, and connects and disconnects another end of the source resonator 210 to and from a ground. A configuration and an operation of the switch 220 will be further described below.

The detector 230 detects a waveform while the at least one source resonator 210 resonates. For example, the detector 230 detects an envelope of an electric signal at one end of the at least one source resonator 210 during a detection time. The electric signal is generated by a resonance occurring in the source resonator 210, and may be, for example, a current signal, a voltage signal, or a power signal. Because a single detector 230 is provided for the plurality of source resonators 219, a size and a power consumption of the wireless power transmission apparatus 110 may be reduced.

The switch controller 240 determines, based on the detected waveform, the source resonator 210 for wireless power transmission, and controls the switch 220 to wirelessly transmit power to the target resonator using the determined source resonator 210. An operation of the switch controller 240 will be further described below. In this application, a source resonator for wireless power transmission is a source resonator that is used to wirelessly transmit power.

Figure 3:
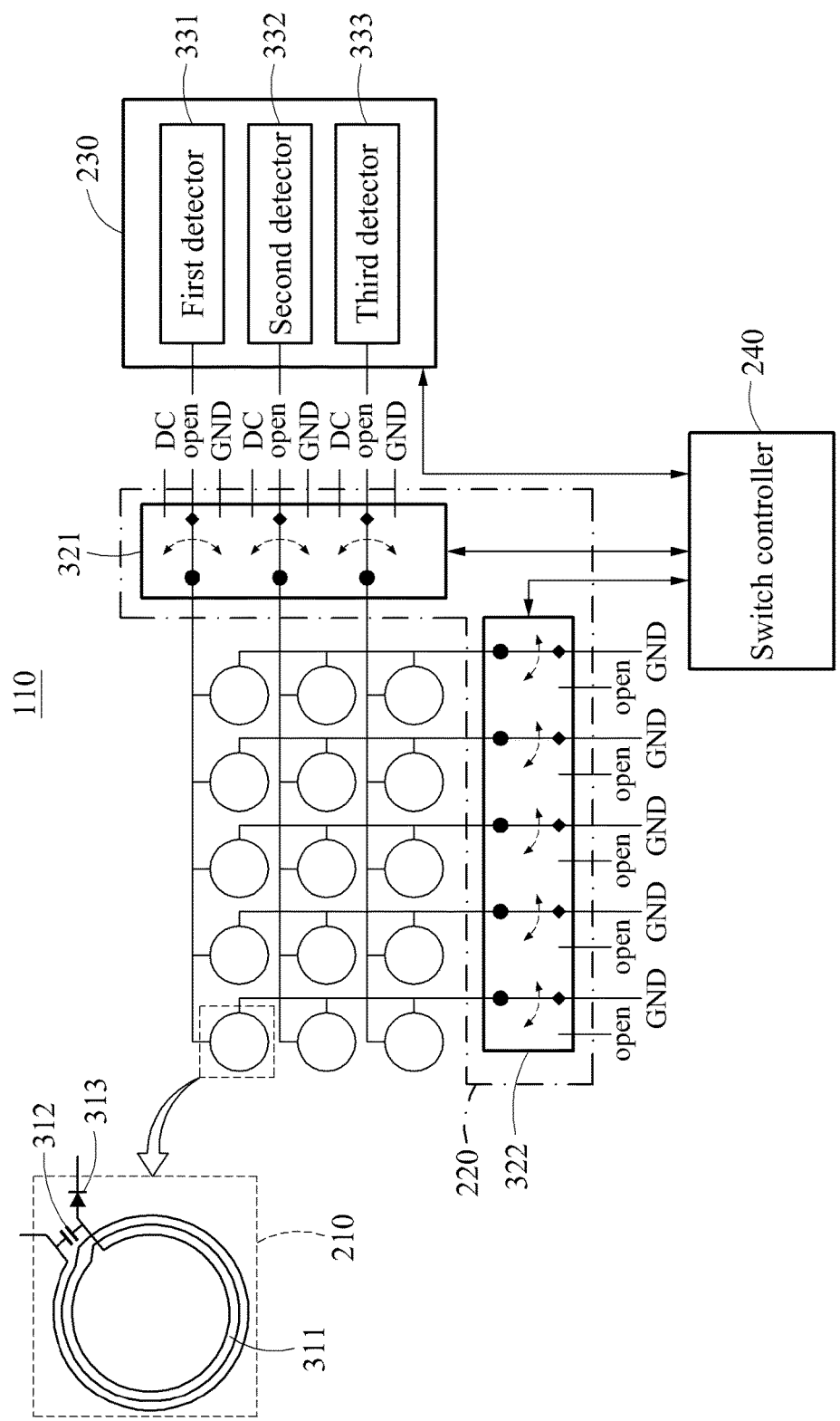
FIG. 3 illustrates a detailed example of a configuration of a wireless power transmission apparatus.

FIG. 3 illustrates a detailed example of a configuration of the wireless power transmission apparatus 110.

The source resonator 210 in the wireless power transmission apparatus 110 includes an inductor 311, a capacitor 312, and a diode 313. The diode 313 prevents received power from flowing to another source resonator. The inductor 311 and the capacitor 312 are used to form resonance coupling with a target resonator.

A plurality of source resonators are arranged in rows and columns. In the example in FIG. 3, the rows intersect the columns at an angle of 90°. However, this is merely an example, and the rows may intersect the columns at an angle of less than 90°, as shown, for example, in FIG. 18. The plurality of source resonators are classified into a plurality of first groups (each first group may be, for example, a group corresponding to a row) and a plurality of second groups (each second group may be, for example, a group corresponding to a column). For example, the plurality of source resonators are classified so that source resonators do not overlap in the first groups, and source resonators do not overlap in the second groups. That is, the plurality of source resonators are classified so that a particular source resonator appears in only one of the first groups so that no two first groups contain the same source resonator, and so that a particular source resonator appears in only one of the second groups so that no two second groups contain the same source resonator. In this example, each source resonator included in the first groups overlaps a single different source resonator included in the second groups. No two source resonators included in the first groups overlap the same source resonator included in the second groups. In one example, source resonators included in each of the first groups have first ends that are connected together, and source resonators included in each of the second groups have second ends that are connected together.

The switch 220 in the wireless power transmission apparatus 110 includes a first switch 321 and a second switch 322.

The first switch 321 selectively connects first ends of source resonators having the first ends connected together among a plurality of source resonators to a direct current (DC) source under the control of the switch controller 240. The first switch 321 selectively connects the first end of each of the source resonators included in a first group (for example, a group corresponding to a row) to the DC source. For example, a plurality of first switches 321 are provided. In this example, each of the first switches 321 connects the first ends of all source resonators corresponding to a single row among a plurality of source resonators arranged in a lattice pattern to the DC source, or connects the first ends of the source resonators to the ground, or disconnects the first ends of the source resonators from the DC source and the ground, under the control of the switch controller 240.

The second switch 322 selectively connects second ends of source resonators having the second ends connected together among the plurality of source resonators to the ground under the control of the switch controller 240. The second switch 322 selectively connects the second end of each of the source resonators included in a second group (for example, a group corresponding to a column) to the ground. For example, a plurality of second switches 322 are provided. In this example, each of the second switches 322 connects or disconnects the second ends of all source resonators corresponding to a single column among a plurality of source resonators arranged in a lattice pattern to or from the ground under the control of the switch controller 240.

The detector 230 detects a waveform at one end of a source resonator 210 during a resonance occurring in the source resonator 210. For example, a plurality of detectors 230, for example, a first detector 331, a second detector 332, and a third detector 333, are provided. In this example, the first detector 331 through the third detector 333 are connected to source resonators 210 via the first switch 321, and detect waveforms at open ends of the source resonators 210. In FIG. 3, the plurality of source resonators are arranged in a lattice pattern, the first detector 331 is connected to an open end of each of source resonators corresponding to a first row, the second detector 332 is connected to an open end of each of source resonators corresponding to a second row, and the third detector 333 is connected to an open end of each of source resonators corresponding to a third row. An open end of a source resonator is an end of the source resonator that is disconnected from both the DC source and the ground. In the example in FIG. 3, the open end of the source resonator is the first end of the source resonator that is disconnected from both the DC source and the ground by the first switch 321.

However, this is merely an example. For example, when the plurality of source resonators are classified into a plurality of first groups and when first ends of the source resonators included in each of the first groups are connected together, a same number of detectors as a number of the first groups is provided, and detectors respectively corresponding to the first groups detect waveforms in response to the first ends of the source resonators of the first groups being disconnected from both the DC source and the ground.

In addition, although FIG. 3 individually illustrates DC sources for each of first switches 321 for convenience of description, in actuality each of the first switches 321 selectively connects a single DC source to one end of each of the source resonators in each group (for example, a group corresponding to a row). However, this is merely an example, and a same number of DC sources as a number of first switches 321 may be individually provided.

The wireless power transmission apparatus 110 repeatedly performs a scanning process of scanning a source resonator 210 proximate to a wireless power reception apparatus and a transmitting process of transmitting power to the scanned source resonator 210 during a predetermined period of time. In the scanning process, the wireless power transmission apparatus 110 tracks a location of the wireless power reception apparatus or determines whether the wireless power reception apparatus is present. A principle of scanning a source resonator 210 proximate to a wireless power reception apparatus will be further described with reference to FIGS. 5, 6, 7, and 8. The scanning process will be further described with reference to FIGS. 9 and 10, and the transmitting process will be further described with reference to FIGS. 11 and 12. The wireless power transmission apparatus 110 repeatedly performs the scanning process and transmitting process at relatively short intervals, and sets a period of time for the scanning process to be shorter than a period of time for the transmitting process.

Figure 4:
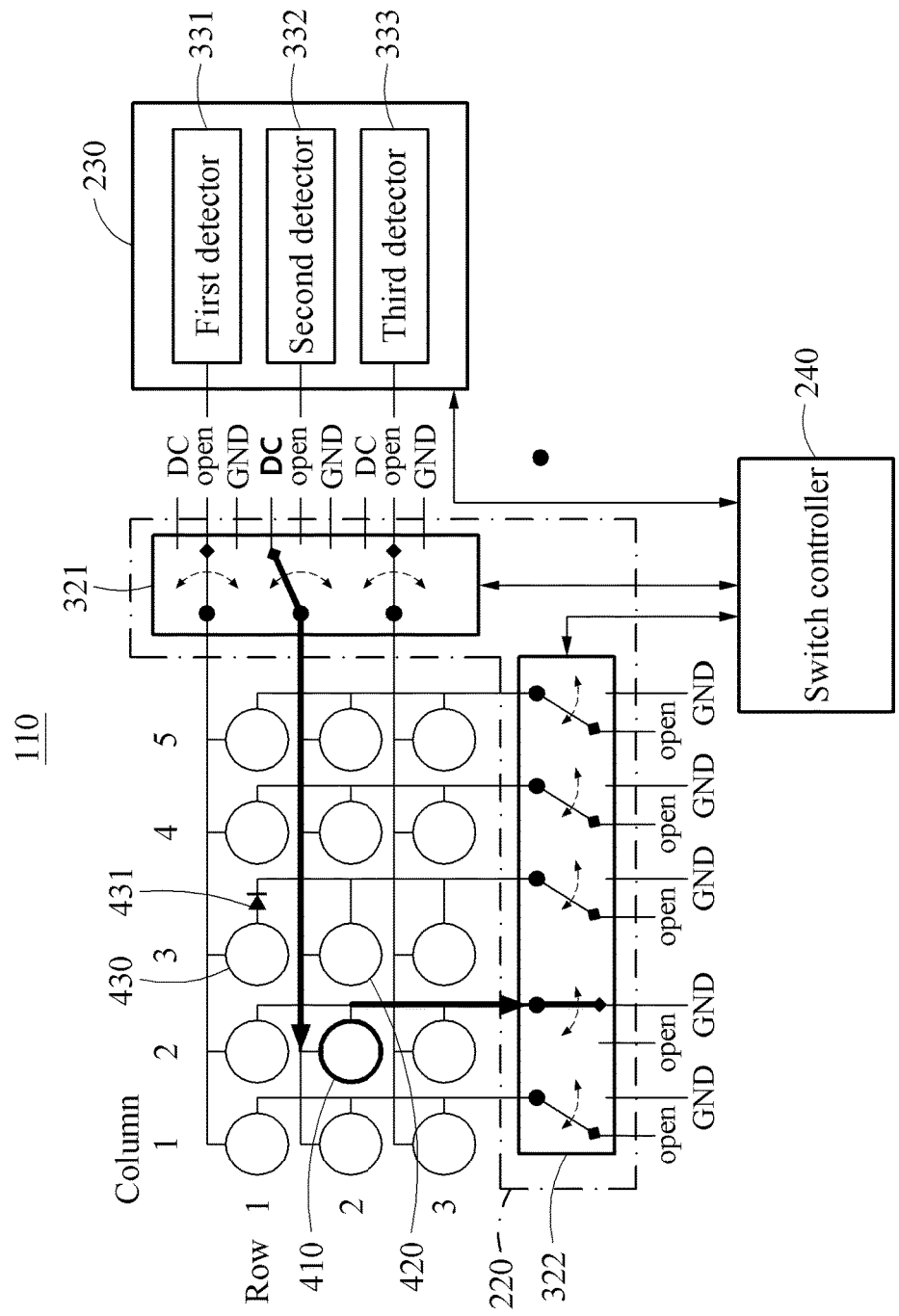
FIG. 4 illustrates an example of an operation of a wireless power transmission apparatus.

FIG. 4 illustrates an example of an operation of the wireless power transmission apparatus 110.

FIG. 4 illustrates a process of operating a source resonator located at a desired location. In FIG. 4, a source resonator 410 in a second row and a second column among a plurality of source resonators arranged in a lattice pattern resonates. For example, the switch controller 240 controls one of the first switches 321 to connect first ends of source resonators in a single first group (for example, a group corresponding to the second row) to a DC source during a predetermined period of time, and controls one of the second switches 322 to connect second ends of source resonators in a single second group (for example, a group corresponding to the second column) to the ground during the predetermined period of time. In this example, first ends of source resonators in the other first groups are disconnected from both the DC source and the ground, and second ends of source resonators in the other second groups are disconnected from the ground. The switch controller 240 controls the first switch 321 and the second switch 322 as described above to operate at least one source resonator to scan a location of a target resonator or wirelessly transmit power to the target resonator.

In other words, the switch controller 240 connects the first switch 321 connected to the source resonator 410 to the DC source, connects the second switch 322 connected to the source resonator 410 to the ground, and disconnects the other source resonators from the DC source and the ground. An inductor and a capacitor of the source resonator 410 connected to the DC source and the ground are charged with DC power in proportion to a time the source resonator 410 is connected to the DC source. When both ends of the source resonator 410 are disconnected from the DC source and the ground after the charging is performed during the predetermined period of time, the source resonator 410 resonates by generating a radio frequency (RF) signal at a resonant frequency of the source resonator 410 and transmits power to a resonator (for example, another source resonator or a target resonator) that is located adjacent to the source resonator 410 and that has the same resonant frequency as the resonant frequency of the source resonator 410.

In one example, when a target resonator of a wireless power reception apparatus is not located proximate to the source resonator 410, power is transmitted to another source resonator that is immediately adjacent to the source resonator 410 and to which power was not supplied from the DC source. In another example, when a target resonator of the wireless power reception apparatus is located immediately above the source resonator 410, most of the power is transmitted to the target resonator because a coupling coefficient between the source resonator 410 and the target resonator is high compared to a coupling coefficient between the source resonator 410 and a neighboring source resonator located on the same plane as the source resonator 410. In the structure illustrated in FIG. 13, a coupling coefficient between neighboring source resonators is further minimized by arranging source resonators in a zigzag pattern.

One end of the source resonator 410 that is intended to resonate and to which power is to be supplied is connected to one end of a source resonator 420 in the second row and a third column, which makes it possible to form a path connected to the ground through a source resonator 430 in a first row and the third column and a source resonator in the first row and the second column. The source resonator 430 includes a diode 431 that prevents a current from flowing backward from the source resonator 420 to the source resonator 430. Thus, it is possible to prevent resonance from occurring in source resonators other than a source resonator that is intended to be operated by the switch controller 240.

The second detector 332 detects a waveform during a resonance occurring in the source resonator 410. Examples of waveforms corresponding to a resonance occurring in a source resonator depending on whether a target resonator is present are described below with reference to FIGS. 5 through 8.

FIGS. 5, 6, 7, and 8 illustrate examples of resonance waveforms in a wireless power transmission apparatus.

Figure 5:
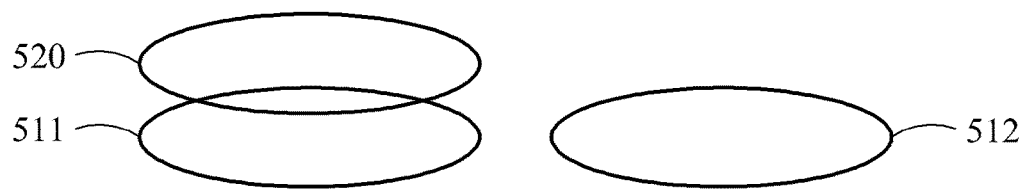
FIGS. 5, 6, 7, and 8 illustrate examples of resonance waveforms in a wireless power transmission apparatus.

Referring to FIG. 5, the wireless power transmission apparatus includes a plurality of source resonators 511 and 512. The source resonator 511 resonates, and a target resonator 520 resonates due to resonance coupling with the source resonator 511. The source resonator 512 is located adjacent to the source resonator 511, and hereinafter is referred to as a neighboring resonator 512.

Figure 6:
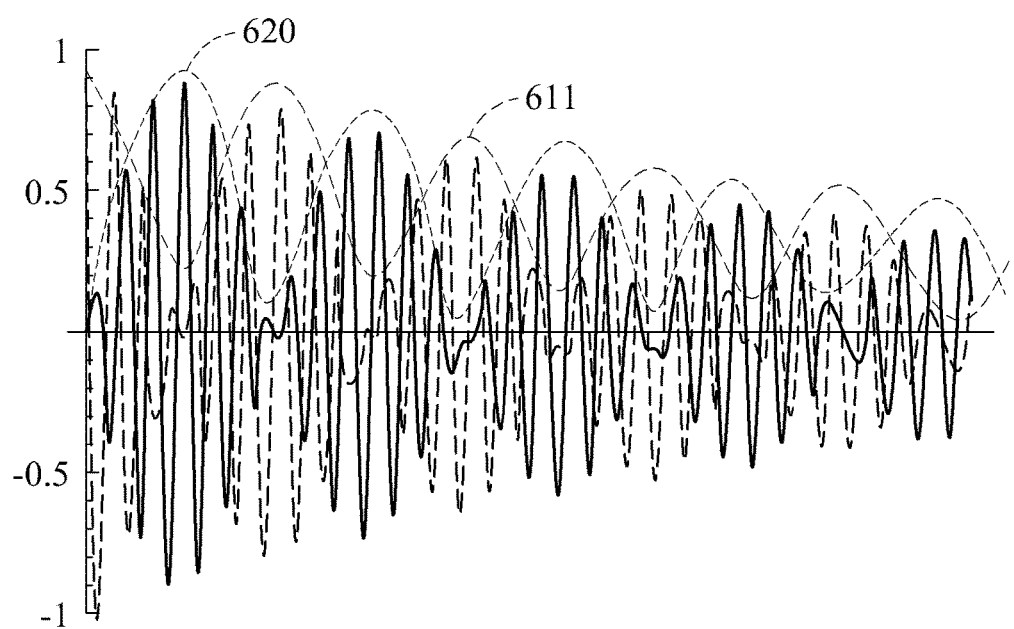
Figure 7:
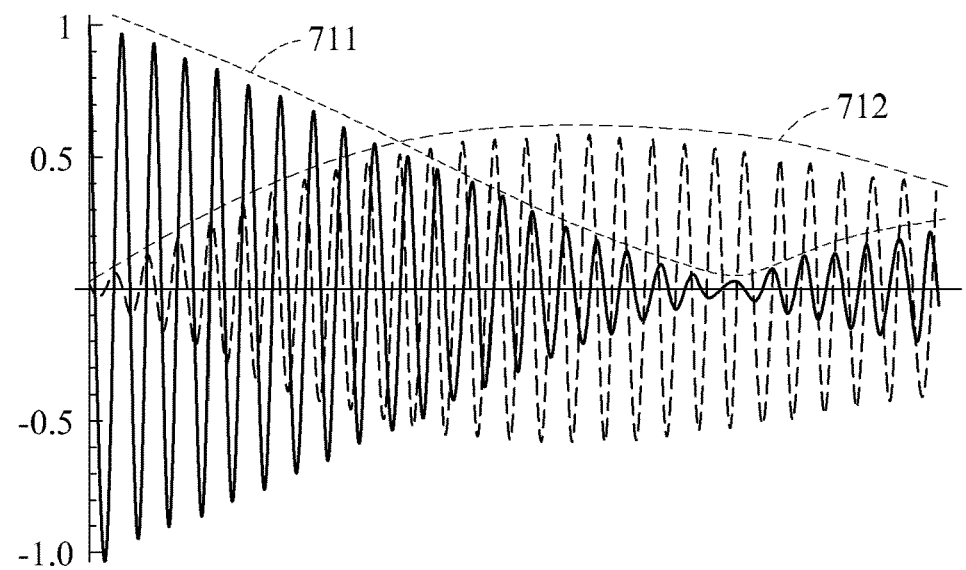
Figure 8:
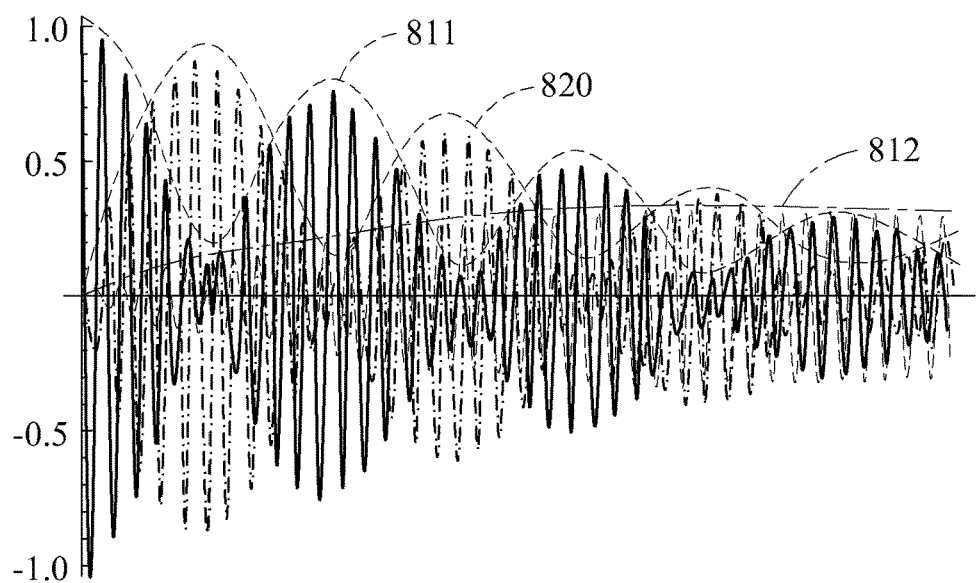

FIG. 6 illustrates a resonance waveform 611 of the source resonator 511 and a resonance waveform 620 of the target resonator 520 when the source resonator 511 and the target resonator 520 are present. FIG. 7 illustrates a resonance waveform 711 of the source resonator 511 and a resonance waveform 712 of the neighboring resonator 512 when the source resonator 511 and the neighboring resonator 512 are present. FIG. 8 illustrates a resonance waveform 811 of the source resonator 511, a resonance waveform 812 of the neighboring resonator 512, and a resonance waveform 820 of the target resonator 520 when the source resonator 511, the neighboring resonator 512, and the target resonator 520 are present. A detector detects an envelope of a waveform of the source resonator 511 while the source resonator 511 resonates.

The wireless power transmission apparatus determines whether the source resonator 511 is a source resonator proximate to a location of a wireless power reception apparatus based on a difference between envelopes of resonance waveforms of the resonator 511 generated by charging the source resonator 511 with power from a DC source and discharging the power. For example, the closer the target resonator 520 is located to the charged source resonator 511, the more rapidly an envelope of a resonance waveform of the source resonator 511 generated during discharging of the source resonator 511 decreases. In other words, a source resonator having a resonance waveform with an envelope that is attenuated more quickly than envelopes of resonance waveforms of the other source resonators during discharging is determined to be a source resonator proximate to the target resonator 520 of the wireless power reception apparatus.

When a target resonator forming resonance coupling with a source resonator is present, as shown in FIGS. 6 and 8, an envelope of a resonance waveform of the source resonator is rapidly attenuated in comparison to when a target resonator is not present as shown in FIG. 7. The waveform 611 of the source resonator 511 of FIG. 6 and the waveform 811 of the source resonator 511 of FIG. 8 are rapidly attenuated in comparison to the waveform 711 of the source resonator 511 of FIG. 7, because power is transmitted to the target resonator 520 as shown in the waveform 620 of the target resonator 520 of FIG. 6 and the waveform 820 of the target resonator 520 of FIG. 8. On the contrary, the waveform 711 is gradually attenuated and the waveform 811 is not greatly affected by the neighboring resonator 512 because a relatively small amount of power is supplied to the neighboring resonator 512 as shown in the waveform 712 of the neighboring resonator 512 of FIG. 7 and the waveform 812 of the neighboring resonator 512 of FIG. 8. Thus, the switch controller 240 determines a source resonator for wireless power transmission based on an attenuation level of a detected waveform.

An attenuation level of an envelope of an electric signal generated during a resonance occurring in a source resonator may be, for example, an attenuation ratio of an envelope, or an attenuation of the envelope to a value less than or equal to a threshold. The attenuation ratio of the envelope is, for example, a ratio of an amplitude of an envelope attenuated from an initial point in time to a predetermined point in time during a detection time with respect to an amplitude of the envelope at the initial point in time. For example, when the attenuation ratio is greater than a threshold ratio, the switch controller 240 determines that a target resonator forming resonance coupling with a source resonator is present. In this example, a wireless power reception apparatus including the target resonator is located above the source resonator.

The threshold may be, for example, a preset amplitude of the envelope at a predetermined point in time during the detection time. When an amplitude of an envelope detected at a predetermined point in time during the detection time is less than or equal to the threshold, the switch controller 240 determines that a target resonator forming resonance coupling with a source resonator is present.

However, the determining whether a target resonator is present based on an attenuation level is not limited to the above description. For example, the switch controller 240 may determine whether a target resonator is present based on various criteria to distinguish attenuation levels of waveforms of FIG. 7 from attenuation levels of waveforms of FIGS. 6 and 8. Also, the switch controller 240 may analyze a shape of a resonance waveform and determine that a target resonator is not present when the shape of the resonance m is similar to the shape of one of waveforms of FIG. 7.

Figure 9:
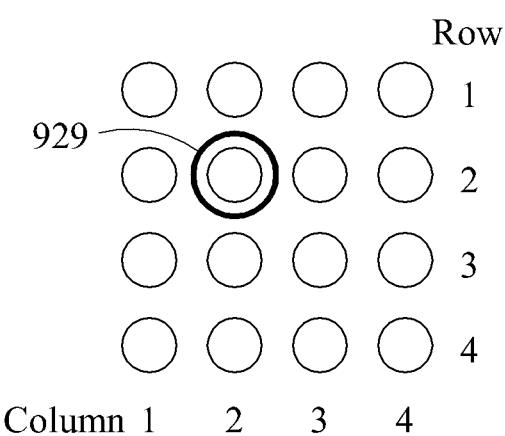
FIGS. 9 and 10 illustrate an example of a process of determining a source resonator for wireless power transmission.
Figure 10:
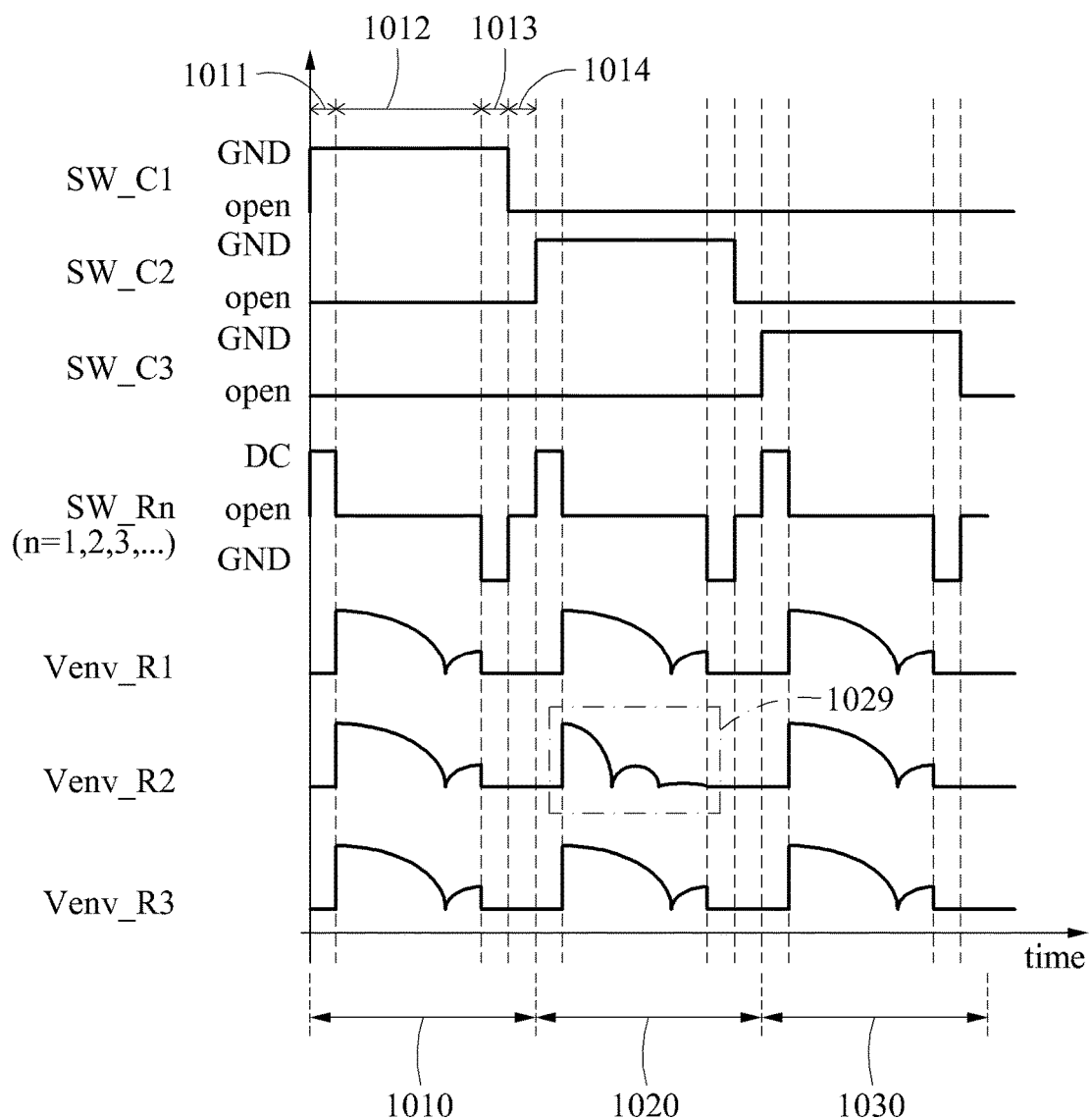

FIGS. 9 and 10 illustrate an example of a process of determining a source resonator for wireless power transmission.

In FIG. 9, a target resonator 929 is located in a second row and a second column in a lattice pattern of a plurality of source resonators in a wireless power transmission apparatus 910.

The wireless power transmission apparatus 910 connects first ends of all source resonators in all first groups (for example, groups corresponding to rows) to a power source, sequentially selects a single second group from a plurality of second groups (for example, a group corresponding to a column), and connects second ends of source resonators in the selected second group to the ground to operate the source resonators in the selected second group. A detector detects an envelope from each of source resonators in the selected second group. This process is repeated for all remaining ones of the second groups, and a switch controller determines a location of a target resonator and a source resonator for wireless power transmission based on the detected envelopes after the envelopes for all of the plurality of source resonators have been detected.

For example, in the scanning process, the wireless power transmission apparatus 910 connects a second switch in a j-th column, where j is an integer greater than or equal to "1" and less than or equal to a number of columns, to the ground, connects first switches in all rows to a DC source, and opens the first switches to operate source resonators in the j-th column in all of the rows. The wireless power transmission apparatus 910 detects resonance waveforms as the source resonators resonate for a predetermined period of time, and determines a location of a source resonator for wireless power transmission based on the resonance waveforms. The wireless power transmission apparatus 910 connects the first switches to the ground, opens the first switches, and opens the second switch in the j-th column. The wireless power transmission apparatus 910 repeatedly performs the above process from a first column to a last column as further described with reference to FIG. 10.

In FIG. 10, the detector detects resonance waveforms of source resonators in a first column during a first scan time 1010, detects resonance waveforms of source resonators in a second column during a second scan time 1020, and detects resonance waveforms of source resonators in a third column during a third scan time 1030. Each of the first scan time 1010 through the third scan time 1030 is a unit of time needed to detect resonance waveforms for a single group. The resonance waveforms of the source resonators in the first column through the third column are illustrated in FIG. 10, but this is merely an example. Accordingly, the detector sequentially detects resonance waveforms for all of the columns.

Hereinafter, in FIG. 10, SW_C1, SW_C2, and SW_C3 denote a connection state of a second switch in the first column, a connection state of a second switch in the second column, and a connection state of a second switch in the third column, respectively. SW_Rn denotes connection states of all first switches. Also, Venv_R1, Venv_R2, and Venv_R3 denote an envelope of a voltage signal detected in a first row, an envelope of a voltage signal detected in a second row, and an envelope of a voltage signal detected in a third row, respectively.

The switch controller controls the first switches and the second switches and operates at least one source resonator. For example, the switch controller supplies power to the at least one source resonator during a first supply time 1011. The supplying of the power is performed, for example, by electrically connecting a source resonator to the DC source.

The switch controller controls the first switches to connect a first end of the at least one source resonator to a power source during the first supply time 1011, and disconnect the first end from the power source when the first supply time 1011 has elapsed. The disconnecting of the first end is performed, for example, by disconnecting an electrical connection between a source resonator and the DC source. Also, during the first supply time 1011, the switch controller controls the second switches to connect a second end of the at least one source resonator to the ground and disconnect of a second end of each of the other source resonators from the ground. For example, during the first supply time 1011 in the first scan time 1010, the switch controller connects the second switch in the first column to the ground, opens second switches in columns other than the first column, and connects all of the first switches to the DC source. When the first supply time 1011 has elapsed, the switch controller controls all of the first switches to open to allow power of source resonators in the first column charged through resonance to be discharged.

During a detection time 1012, the detector detects an envelope of an electric signal generated during a resonance occurring in the at least one source resonator. For example, during the detection time 1012 in the first scan time 1010, the switch controller maintains a connection of the second switch in the first column to the ground, maintains an open state of each of the second switch in the second column and the second switch in the third column, and changes a state of each of the first switches to an open state.

When the detection time 1012 has elapsed, the switch controller controls a switch to connect both ends of the at least one source resonator to the ground. For example, during a reset time 1013, the switch controller connects both ends of a source resonator to the ground. The switch controller performs resetting by connecting both ends of a source resonator to the ground to avoid influencing an envelope of a source resonator in a next column. During a margin time 1014, the switch controller disconnects both ends of the source resonator from the ground.

The switch controller determines a source resonator for wireless power transmission based on an attenuation level of a waveform detected by the detector. In FIG. 10, the resonance waveforms detected during the first scan time 1010 and the resonance waveforms detected during the third scan time 1030 are gradually attenuated, and accordingly correspond to a waveform of FIG. 7. Thus, the switch controller determines that a target resonator is not located above source resonators in the first column and the third column scanned during the first scan time 1010 and the third scan time 1030. On the contrary, an envelope 1029 of a voltage signal detected from a source resonator in the second row and the second column among envelopes of resonance waveforms detected during the second scan time 1020 is rapidly attenuated in comparison to the other resonance waveforms, and accordingly corresponds to a waveform of FIG. 8. Thus, the switch controller determines that a target resonator is located above the source resonator in the second row and the second column, and determines that source resonator to be a source resonator for wireless power transmission.

The first scan time 1010 has been described with reference to FIGS. 9 and 10, and the description of the first scan time 1010 is also applicable to the other scan times including the second scan time 1020 and the third scan time 1030.

Also, for convenience of description, the detector detects the resonance waveforms for the first column through the third column in FIGS. 9 and 10, but this is merely an example. When a plurality of source resonators are classified into a plurality of groups, the switch controller selects source resonators in a single group among the plurality of groups. For example, the switch controller selects at least one source resonator from the plurality of source resonators in a preset order (for example, an order of rows or columns in a lattice pattern), and operates the selected source resonator. In this example, the switch controller selects source resonators in a single row or a single column from the lattice pattern. The detector detects waveforms for all the plurality of source resonators in the preset order.

Thus, the switch controller sequentially selects a single group from the plurality of groups, controls a switch to operate source resonators included in the selected group, and sequentially acquires waveforms for all of the plurality of source resonators from the detector. For example, the switch controller acquires resonance waveforms for all of the columns while changing from the first column to the last column, and determines a source resonator to which power is to be supplied after acquiring the resonance waveforms for all of the plurality of source resonators.

Figure 11:
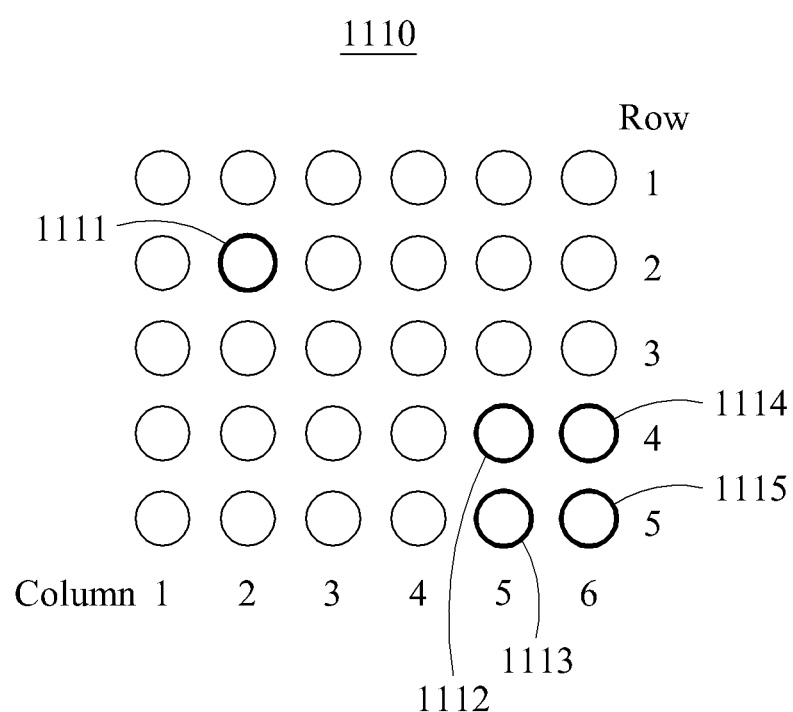
FIGS. 11 and 12 illustrate an example of a process of wirelessly transmitting power using a determined source resonator.
Figure 12:
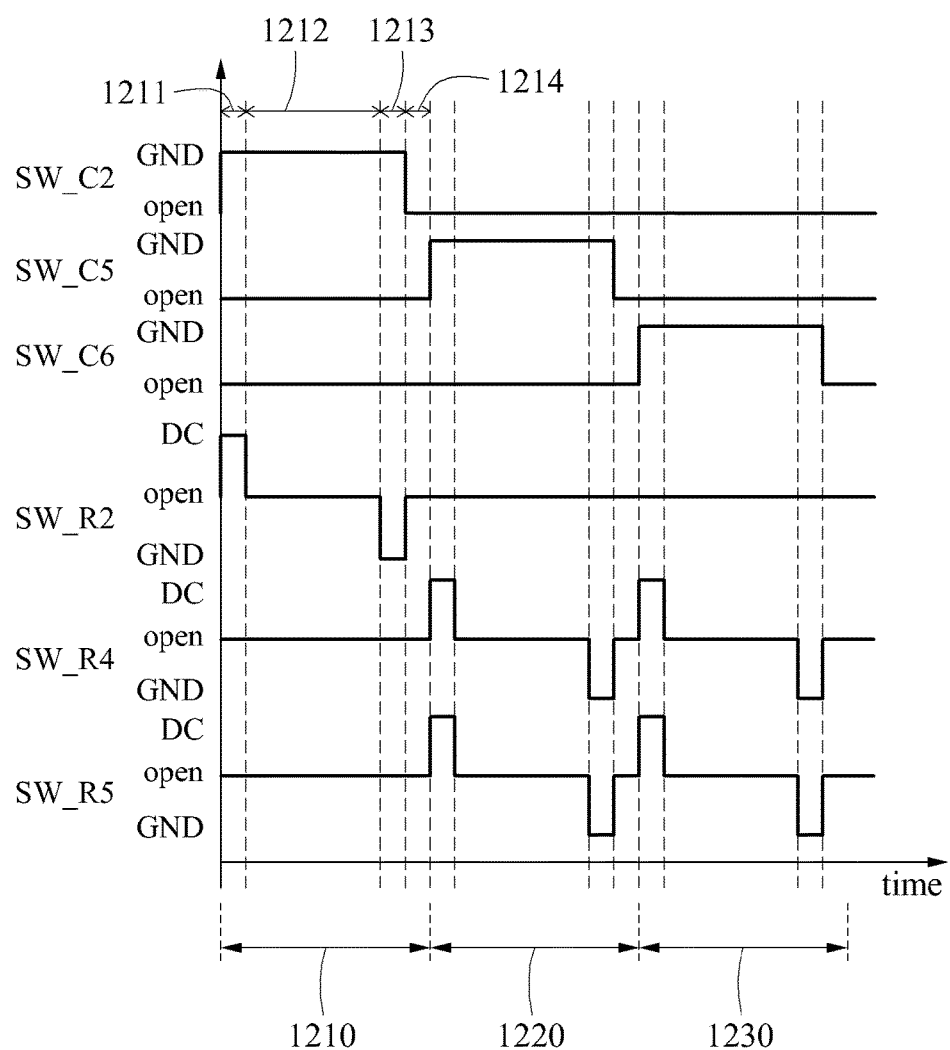

FIGS. 11 and 12 illustrate an example of a process of wirelessly transmitting power using a determined source resonator.

A wireless power transmission apparatus 1110 of FIG. 11 sequentially operates source resonators determined to wirelessly transmit power. The wireless power transmission apparatus 1110 connects to the ground a second switch of a column in which a source resonator to which power is to be supplied is located, opens second switches of the other columns, connects to a DC source a first switch of a row in which the source resonator is located to charge the source resonator during a predetermined period of time, and opens the first switch to operate the source resonator. The wireless power transmission apparatus 1110 transmits power to a target resonator through resonance occurring in a determined source resonator, and then connects all first switches to the ground to discharge any remaining power and minimize an influence on transmission of power to a next column.

In FIG. 11, target resonators are located in a location 1111 of a second row and a second column, a location 1112 of a fourth row and a fifth column, a location 1113 of a fifth row and the fifth column, a location 1114 of the fourth row and a sixth column, and a location 1115 of the fifth row and the sixth column. A switch controller determines that the target resonators are located in the locations 1111 through 1115, and determines to transmit power to the target resonators using source resonators corresponding to the locations 1111 through 1115.

For example, in the transmitting process, the wireless power transmission apparatus 1110 connects a second switch of a j-th column to the ground, connects to the DC source a first switch of a row to which power is determined to be supplied, and opens the first switch to operate a source resonator in the row and the j-th column. The wireless power transmission apparatus 1110 transmits power as the source resonator resonates for a predetermined period of time. The wireless power transmission apparatus 1110 connects the first switch to the ground, opens the first switch, and opens the second switch. The wireless power transmission apparatus 1110 determines j to be a number of a column determined to supply power, and repeatedly performs the above process for all determined columns. Also, the wireless power transmission apparatus 1110 repeatedly performs the above transmitting process during a predetermined period of time or a predetermined number of times.

Hereinafter, in FIG. 12, SW_C2, SW_C5, and SW_C6 denote a connection state of a second switch in the second column, a connection state of a second switch in the fifth column, and a connection state of a second switch in the sixth column, respectively. SW_R2, SW_R4, and SW_R5 denote a connection state of a first switch in the second row, a connection state of a first switch in the fourth row, and a connection state of a first switch in the fifth row, respectively.

In FIG. 12, the switch controller controls a switch to connect a first end of a determined source resonator (for example, a source resonator to which power is to be supplied) to a power source during a second supply time 1211, disconnect the first end from the power supply when the second supply time 1211 has elapsed, and connect both ends of the source resonator to the ground when a transmission time 1212 has elapsed from a point in time at which the first end is opened. For example, the switch controller controls the first switch in the second row to connect one end of a source resonator to the power source during the second supply time 1211 in a first power interval 1210. In this example, during the second supply time 1211, the second switch in the second column is connected to the ground and the other switches are opened. The switch controller opens the first switch in the second row during the transmission time 1212, and connects the first switch in the second row to the ground during a reset time 1213 after the transmission time 1212 has elapsed. During a margin time 1214, the switch controller maintains each of the first switches and the second switches in open states.

Also, as shown in FIG. 12, the wireless power transmission apparatus 1110 divides time into intervals corresponding to columns. In the first power interval 1210, a source resonator in the second row and the second column is used to transmit power. In a second power interval 1220, a source resonator in the fourth row and the fifth column and a source resonator in the fifth row and the fifth column are used to transmit power. In a third power interval 1230, a source resonator in the fourth row and the sixth column and a source resonator in the fifth row and the sixth column are used to transmit power.

The first power interval 1210 has been described with reference to FIGS. 11 and 12, and the description of the first power interval 1210 is also applicable to the other power intervals including the second power interval 1220 and the third power interval 1230. A number of power intervals and a length of a power interval are changed based on a design of the wireless power transmission apparatus.

For example, the wireless power transmission apparatus connects to the ground both ends of each of source resonators in rows other than a row in which a source resonator determined for power transmission is located to prevent resonance from occurring in the source resonators in the other rows. Thus, the wireless power transmission apparatus prevents power from being unnecessarily transmitted to source resonators located adjacent to the determined source resonator, for example, in rows above and below the determined source resonator.

Figure 13:
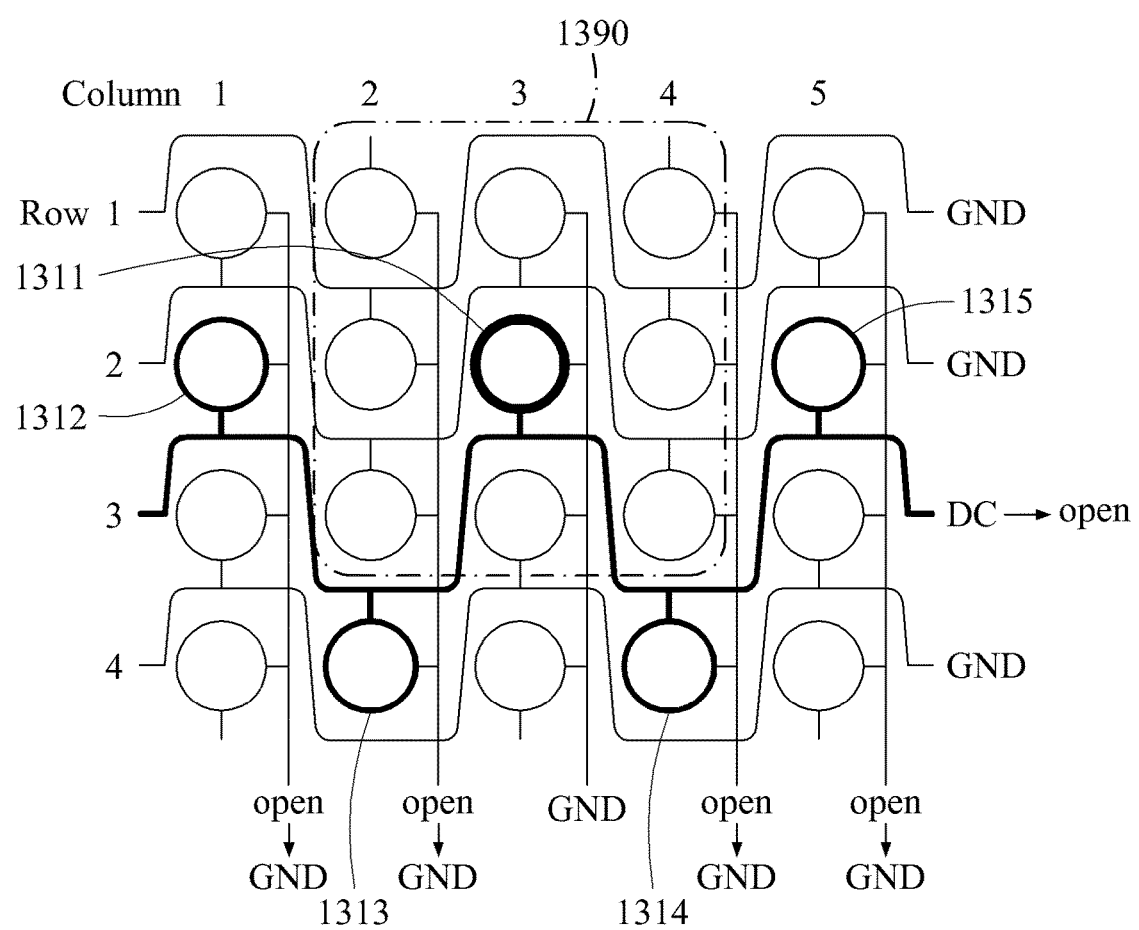
FIG. 13 illustrates an example of source resonators arranged in a zigzag pattern.

FIG. 13 illustrates an example of source resonators arranged in a zigzag pattern.

A plurality of source resonators in a wireless power transmission apparatus are arranged in patterns other than a lattice pattern. For example, in FIG. 13, a plurality of source resonators are arranged in a zigzag pattern. Among the plurality of source resonators, source resonators (for example, source resonators in a first group) having first ends connected together are arranged in the zigzag pattern, and source resonators (for example, source resonators in a second group) having second ends connected together are arranged in a straight line.

In FIG. 13, a first switch in a third row is connected to a DC source and is opened. A second switch in a third column remains connected to the ground, and second switches in the other columns are opened and then connected to the ground.

Source resonators 1311, 1312, 1313, 1314, and 1315 are connected to the first switch in the third row, and the second switches connected to the source resonators 1312 through 1315 are opened. Accordingly, the source resonators 1312 through 1315 are not charged and do not resonate, and only the source resonator 1311 in the third row and the third column resonates.

Because both ends of each of resonators 1390 neighboring the source resonator 1311 are connected to the ground, the resonators 1390 do not resonate. Thus, it is possible to reduce unnecessary power consumption in comparison to a structure of FIG. 4 in which power is likely to be transmitted to source resonators located horizontally adjacent to a source resonator determined to transmit power. In the structure of FIG. 13, the wireless power transmission apparatus connects to the ground both ends of each of source resonators located horizontally adjacent to a source resonator determined to transmit power. Accordingly, source resonators connected to the same switch, for example, the first switch, are not located horizontally adjacent to each other, and thus it is possible to prevent mutual resonance between horizontally neighboring source resonators. Also, the wireless power transmission apparatus prevents a loss of power due to unnecessary resonance.

FIGS. 14, 15, 16, and 17 illustrate examples of a process of determining a source resonator for wireless power transmission among source resonators arranged in a zigzag pattern.

Figure 14:
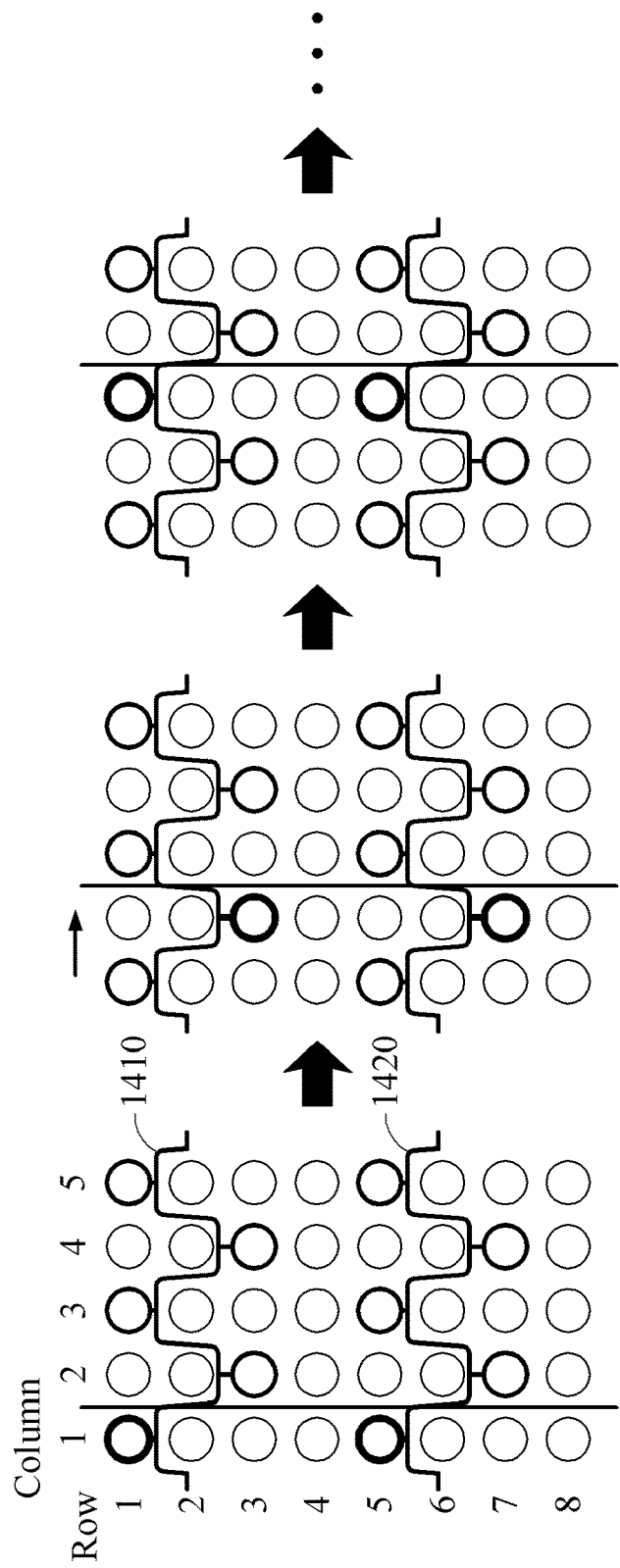
FIGS. 14, 15, 16, and 17 illustrate examples of a process of determining a source resonator for wireless power transmission among source resonators arranged in a zigzag pattern.
Figure 15:
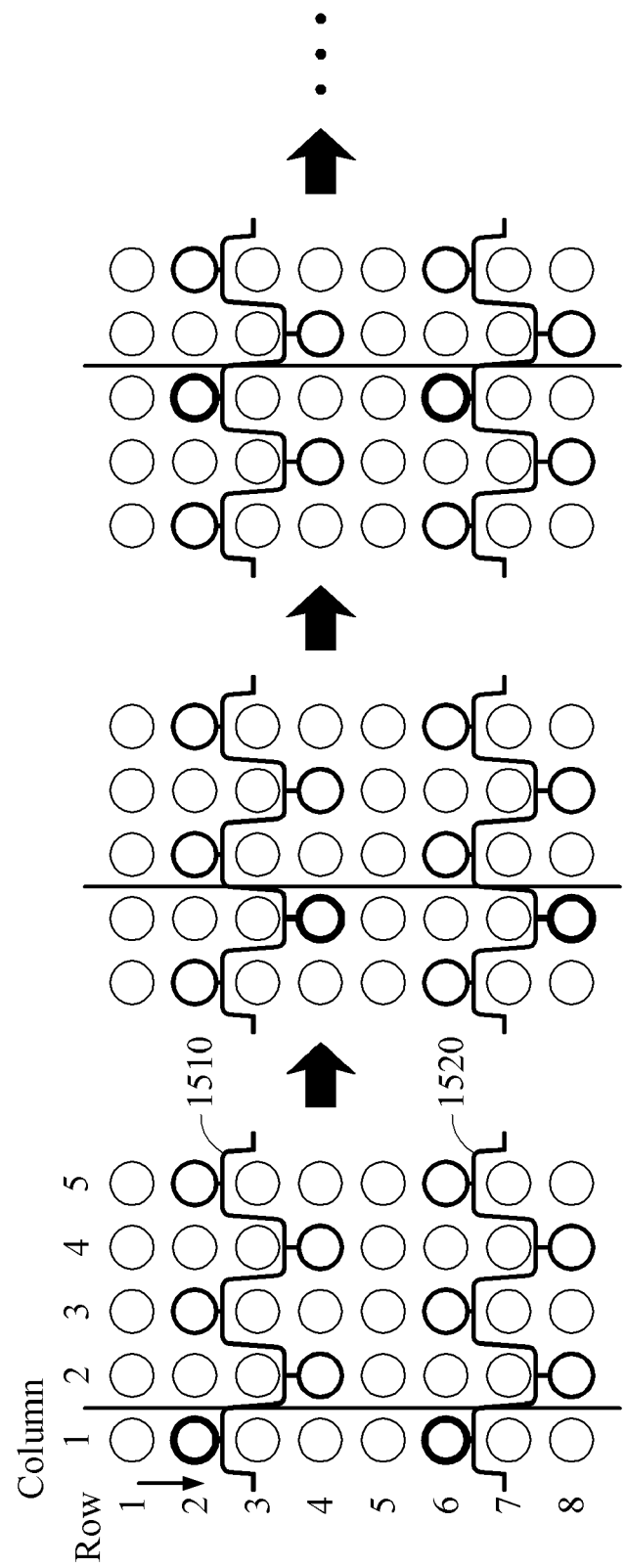

FIGS. 14 and 15 are diagrams provided to explain examples of an order of resonance occurring in a scanning process in the zigzag pattern. For example, in FIG. 14, a first switch 1410 in a second row and a first switch 1420 in a sixth row are controlled to operate a series of source resonators connected to the first switches 1410 and 1420 in an order of columns (for example, in an order of a first column, a second column, and a third column). A switch controller selects first groups spaced apart from each other by a predetermined distance from a plurality of first groups (for example, rows) and operates resonators in the selected first groups. For example, in FIG. 14, groups of three rows are set (for example, rows are classified into four row groups, for example, a group including the second row, the sixth row, and a tenth row, a group including a third row, a seventh row, and an eleventh row, a group including a fourth row, an eighth row, and a twelfth row, and a group including a first row, a fifth row, and a ninth row), and accordingly it is possible to prevent interference between a source resonator operated by the first switch 1410 and a source resonator operated by the first switch 1420. When scanning of the first groups determined by the switch controller is completed, the switch controller scans next first groups (for example, source resonators connected to a first switch 1510 in a third row and source resonators connected to a first switch 1520 in a seventh row) as shown in FIG. 15.

Figure 16:
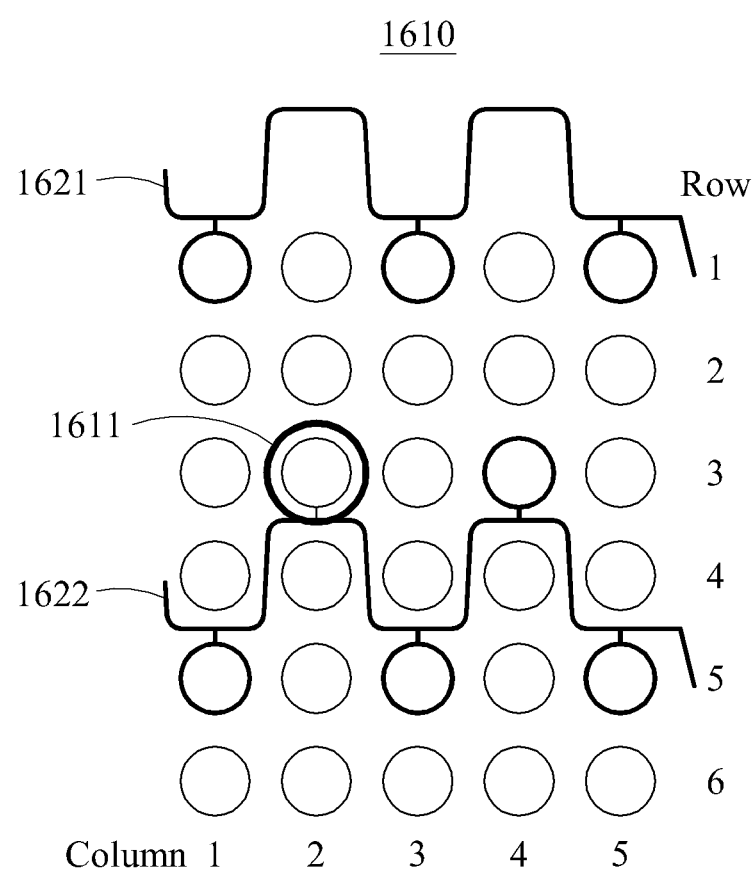
Figure 17:
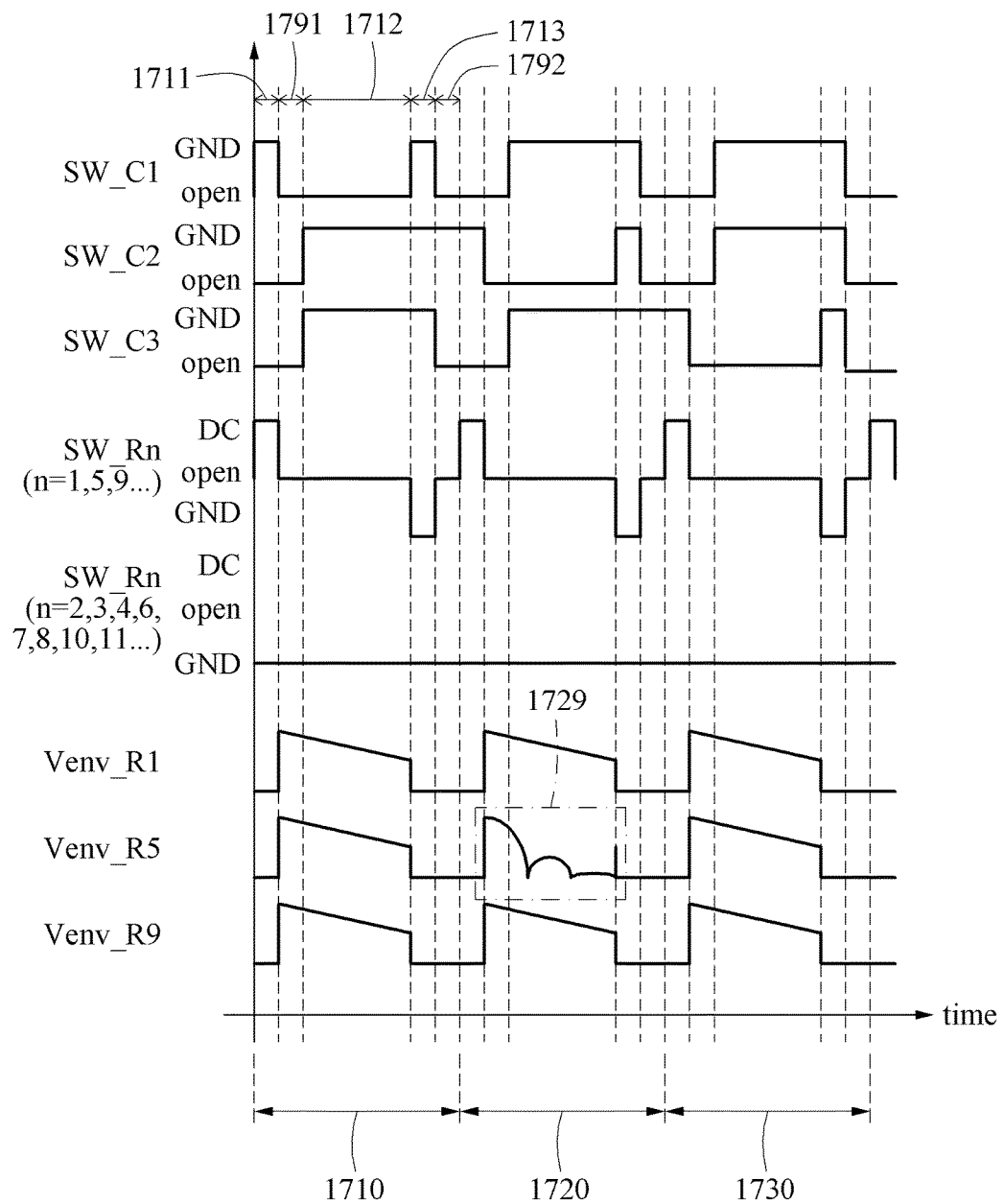

FIGS. 16 and 17 illustrate an example of detection of a resonance waveform when a target resonator 1611 is located in a third row and a second column in a wireless power transmission apparatus 1610.

In FIG. 16, a switch controller controls a switch 1621 in a first row and a switch 1622 in a fifth row to operate source resonators connected to the switches 1621 and 1622.

For example, in the scanning process in the structure of FIG. 13, the wireless power transmission apparatus 1610 opens a first switch in a (4n+r)-th row, where n is an integer greater than or equal to "0" that enables a value of "4n+r" to be less than or equal to a number of rows, and r is an integer greater than or equal to "1" and less than or equal to "4," and connects first switches in the other rows to the ground. The wireless power transmission apparatus 1610 connects a second switch in a j-th column to the ground, and opens second switches in the other columns. Also, the wireless power transmission apparatus 1610 connects the first switch in the (4n+r)-th row to a DC source, opens the first switch in the (4n+r)-th row, opens the second switch in the j-th column, and connects the second switches in the other columns to the ground. The wireless power transmission apparatus 1610 detects an envelope from the (4n+r)-th row and the j-th column, and determines a source resonator to which power is to be supplied based on the detected envelope. The wireless power transmission apparatus 1610 connects the first switch in the (4n+r)-th row to the ground, opens the first switch in the (4n+r)-th row, and connects the second switch in the j-th column to the ground. The wireless power transmission apparatus 1610 repeatedly performs the above process from a first column to the last column. When the process for all of the columns is completed, r is changed, for example, is changed in an order of "1" to "4," and a row is changed. The above process is repeated for all rows. Hereinafter, an example of the above process is described with reference to FIG. 17.

Hereinafter, in FIG. 17, SW_C1, SW_C2, and SW_C3 denote a connection state of a second switch in a first column, a connection state of a second switch in a second column, and a connection state of a second switch in a third column, respectively. SW_Rn denotes a connection state of a first switch in an n-th row. Also, Venv_R1, Venv_R5, and Venv_R9 denote an envelope of a voltage signal detected in a first row, an envelope of a voltage signal detected in a fifth row, and an envelope of a voltage signal detected in a ninth row, respectively.

As described above, the switch controller supplies power to a source resonator in the first row, a source resonator in the fifth row, and a source resonator in the ninth row during a first supply time 1711 in a first scan time 1710. During the first supply time 1711, the first switches in the first, fifth, and ninth rows are connected to the DC source, the first switches in the other rows are connected to the ground, the second switch in the first column is connected to the ground, and the second switches in the other columns are maintained in an open state, so that the switch controller charges the source resonators in the first row and the first column, the fifth row and the first column, and the ninth row and the first column with power for scanning. During a transmission time 1712 in the first scan time 1710, the switch controller opens the first switches in the first, fifth, and ninth rows to operate the charged source resonators. During a reset time 1713 in the first scan time 1710, the switch controller connects the first switches and the second switches in all of the rows and all of the columns to the ground to connect both ends of all of the source resonators to the ground. A margin time 1791 is set between the first supply time 1711 and the transmission time 1712, and a margin time 1792 is set between the reset time 1713 and a second scan time 1720.

In FIG. 17, a resonance waveform 1729 with a high attenuation level is detected in the fifth row and the second column, and the switch controller determines a source resonator corresponding to the detected resonance waveform 1729 to be a source resonator for wireless power transmission.

The first scan time 1710 has been described with reference to FIG. 17, and the description of FIG. 17 is also applicable to other scan times including the second scan time 1720 and a third scan time 1730. The second scan time 1720 and the third scan time 1730 are designated for the second column and the third column, respectively.

A transmitting process in the structure of FIG. 13 is performed similarly to the transmitting process in the structure of FIG. 4. For example, the wireless power transmission apparatus 1610 opens a first switch in the (4n+r)-th row to which power is determined to be supplied, and connects first switches in the other rows to the ground. The wireless power transmission apparatus 1610 connects the second switch in the j-th column to the ground, and opens second switches in the other columns. Also, the wireless power transmission apparatus 1610 connects to the DC source the first switch in the row to which power is determined to be supplied among the "4n+r" rows, and opens the first switch. The wireless power transmission apparatus 1610 opens the second switch in the j-th column, and connects the second switches in the other columns to the ground. The wireless power transmission apparatus 1610 connects the first switch in the (4n+r)-th row to the ground, opens the first switch in the (4n+r)-th row, and connects the second switch in the j-th column to the ground. The wireless power transmission apparatus 1610 selects the j-th column as a column corresponding to a source resonator to which power is determined to be supplied in a predetermined row r in which the source resonator is located, and repeatedly performs the above process. When the process of all designated columns to which power is to be supplied in the row r is completed, the row r is changed to another row in which a source resonator to which power is to be supplied is located. The above process is repeated for all rows in which a source resonator to which power is to be supplied is located.

Figure 18:
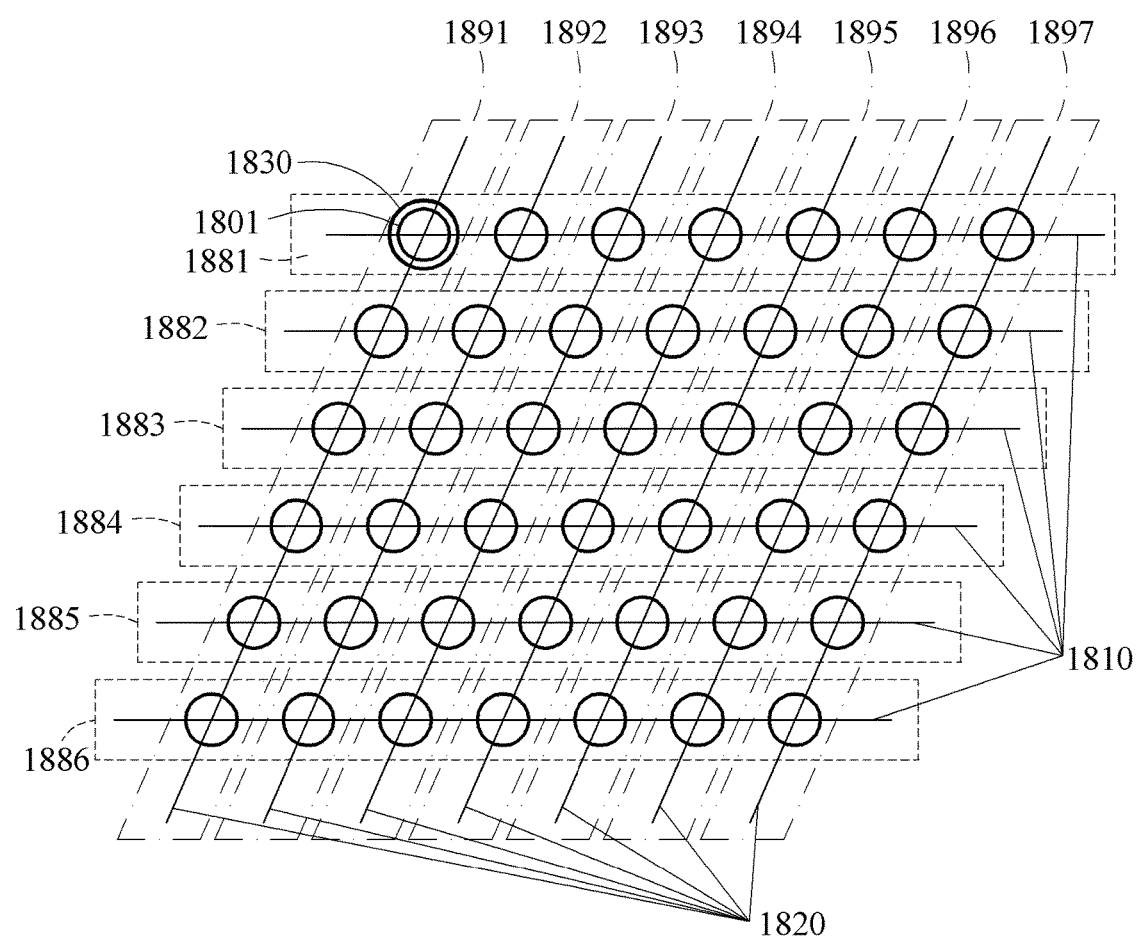
FIGS. 18 and 19 illustrate examples of an arrangement of source resonators.
Figure 19:
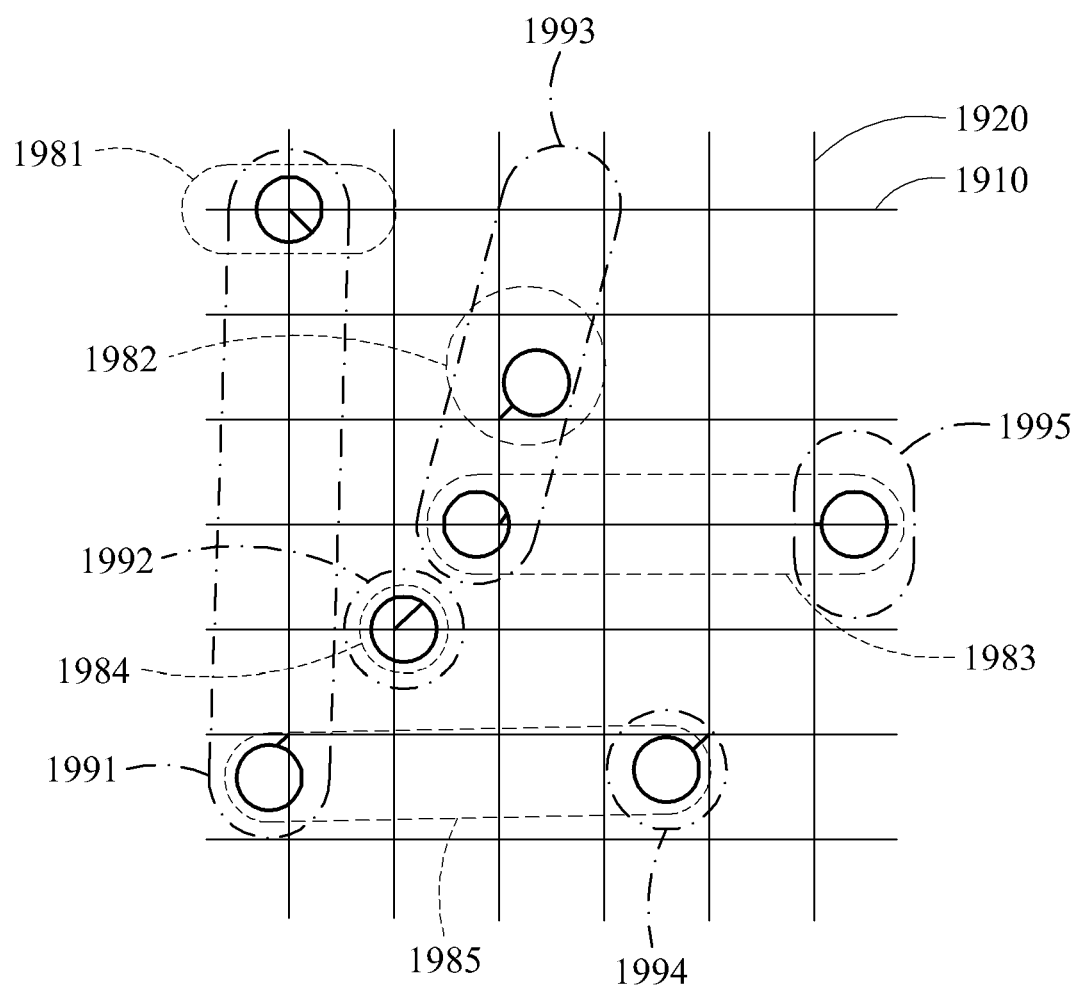

FIGS. 18 and 19 illustrate examples of an arrangement of source resonators.

FIG. 18 illustrates an example in which a plurality of source resonators 1801 are arranged at intersection points, for example, an intersection point 1830, at which a plurality of parallel first axes 1810 intersect a plurality of parallel second axes 1820. First ends of source resonators arranged along one of the plurality of first axes 1810 are connected to a power source using a same switch, for example, a first switch. Also, second ends of source resonators arranged along one of the plurality of second axes 1820 are connected to the ground using a same switch, for example, a second switch. For example, source resonators included in each of a plurality of first groups 1881 through 1886 have first ends connected together. Source resonators included in each of a plurality of second groups 1891 through 1897 have second ends connected together. Because the first axes 1810 are not parallel to the second axes 1820, each one of the first axes 1810 necessarily intersects with each one of the second axes 1820 at a single point.

As shown in FIG. 18, the plurality of source resonators 1801 are arranged in a regular pattern, for example, a hexagonal tile pattern, a pentagonal tile pattern, or a lattice pattern.

FIG. 19 illustrates an example in which a plurality of source resonators are randomly arranged. In FIG. 19, a plurality of parallel first virtual axes 1910 intersect a plurality of parallel second virtual axes 1920. Each of the source resonators is connected to a closest one of intersection points at which the first virtual axes 1910 and the second virtual axes 1920 intersect.

The plurality of source resonators are classified into first groups 1981 through 1985 and second groups 1991 through 1995. For example, the plurality of source resonators are classified so that source resonators do not overlap in the first groups 1981 through 1985, and that source resonators do not overlap in the second groups 1991 through 1995. That is, the plurality of source resonators are classified so that a particular source resonator appears in only one of the first groups 1981 through 1985 so that no two first groups of the first groups 1981 through 1985 contain the same source resonator, and so that a particular source resonator appears in only one of the second groups 1991 through 1995 so that no two second groups of the second groups 1991 through 1995 contain the same source resonator. In this example, each source resonator included in the first groups 1981 through 1985 overlaps a single different source resonator included in the second groups 1991 through 1995. No two source resonators included in the first groups 1981 through 1985 overlap the same source resonator included in the second groups 1991 through 1995.

Figure 20:
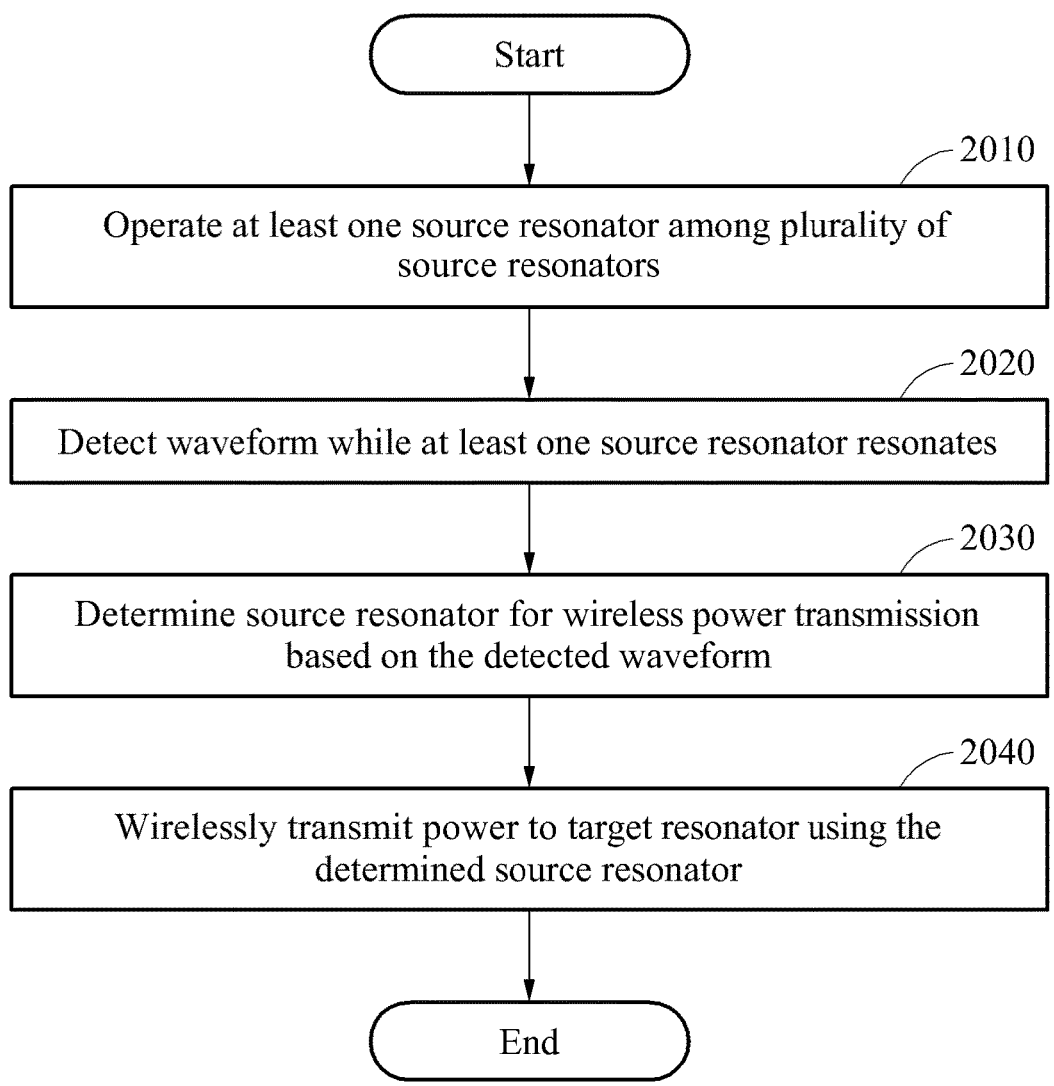
FIG. 20 illustrates an example of a wireless power transmission method.

FIG. 20 illustrates an example of a wireless power transmission method.

Referring to FIG. 20, in operation 2010, a switch controller operates at least one source resonator among a plurality of source resonators.

In operation 2020, a detector detects a waveform while the at least one source resonator resonates.

In operation 2030, the switch controller determines, based on the detected waveform, a source resonator for wireless power transmission.

In operation 2040, the switch controller wirelessly transmits power to a target resonator using the determined source resonator.

The descriptions of FIGS. 1 through 19 are also applicable to operations 2010 through 2040, and accordingly are not repeated here.

Figure 21:
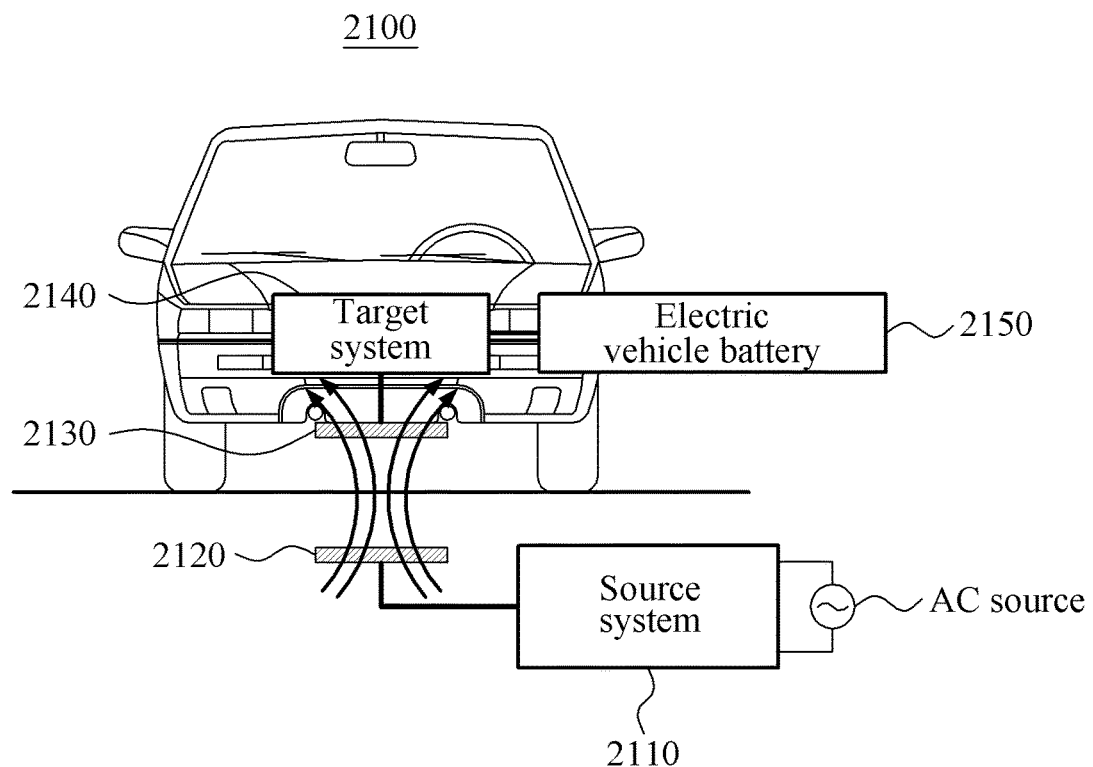
FIG. 21 is a diagram illustrating an example of a wireless electric vehicle charging system.

FIG. 21 is a diagram illustrating an example of an electric vehicle charging system.

FIG. 1 illustrates an example in which a plurality of wireless power transmission apparatuses 120 wirelessly receive power from a wireless power transmission apparatus 110 including a plurality of source resonators 111. In the example in FIG. 1, the wireless power reception apparatus 120 is an electronic device including a target resonator, and may be, for example, a portable device or a cordless stationary device. The portable device may be, for example, a mobile phone, a smartphone, a notebook personal computer (PC), or a tablet PC, and the cordless stationary device may be, for example, a wireless display.

However, this is merely an example, and the wireless power reception apparatuses 120 may be an electric vehicle with a wireless power charging system, and the source resonators 111 may be disposed in a garage or a parking lot, for example.

Referring to FIG. 21, a wireless electric vehicle charging system 2100 includes a source system 2110, a source resonator 2120, a target resonator 2130, a target system 2140, and an electric vehicle battery 2150. The target resonator 2130, the target system 2140, and the electric vehicle battery 2150 are mounted in an electric vehicle. However, this is just an example, and the target resonator 2130, the target system 2140, and the electric vehicle battery 2150 may be mounted in a hybrid electric vehicle, an electric bicycle, or any other conveyance known to one of ordinary skill in the art that receives its motive power from a battery.

The source resonator 2120 and the target resonator 2130 have a same resonant frequency, which may be in a band of a few kilohertz (kHz) to tens of megahertz (MHz).

The source system 2110 and the source resonator 2120 operate as a source to transmit wireless power at the resonant frequency of the source resonator 2120 and the target resonator 2130. The target resonator 2130 and the target system 2140 operate as a target to receive the wireless power transmitted by the source resonator 2120.

The source system 2110 converts power from an alternating-current (AC) source having, for example, a frequency of 50 or 60 Hz to power having the resonant frequency of the source resonator 2120 and the target resonator 2130, and supplies the converted power to the source resonator 2120. The source resonator 2120 transmits the converted power as wireless power having the resonant frequency to the target resonator 2130 via magnetic resonance between the source resonator 2120 and the target resonator 2130. The transmitted wireless power may be tens of watts or higher. The target resonator 2130 supplies the power received from the source resonator 2120 to the target system 2140. The target system 2140 converts the received power to a direct-current (DC) charging power suitable for charging the electric vehicle battery 2150. The electric vehicle battery 2150 is charged by the DC charging power.

The source system 2110 may include any of the wireless power transmission apparatuses described herein with respect to FIGS. 1-20. The source resonator 2120 may be any of the source resonators described herein with respect to FIGS. 1-20, and may be arranged in any of the patterns described herein with respect to FIGS. 1-20. The target resonator 2130 may be any of the target resonators described herein with respect to FIGS. 1-20.

For the most efficient transmission of power, the source resonator 2120 and the target resonator 2130 need to be aligned with each other. The source resonator 2120 and the target resonator 2130 are aligned with each other when the target resonator 2130 is located at a position enabling a maximum magnetic resonance to occur between the source resonator 2120 and the target resonator 2130.

When the electric vehicle does not stop at a position at which the source resonator 2120 and the target resonator 2130 are aligned with each other, the source system 2110 may transmit a message to the target system 2140 to control the source resonator 2120 and the target resonator 2130 to be aligned with each other, or to inform an operator of the electric vehicle to adjust the position of the electric vehicle so that the source resonator 2120 and the target resonator 2130 are aligned with each other.

The wireless power transmission apparatuses 110, 910, 1110, and 1610 illustrated in FIGS. 1-4, 9, 11, and 16, the detector 230 and the switch controller 240 illustrated in FIGS. 2-4, the first detector 331, the second detector 332, and the third detector 333 illustrated in FIGS. 3 and 4, and the source system 2110 and the target system 2140 illustrated in FIG. 21 that perform the operations described herein are implemented by hardware components. Examples of hardware components include controllers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The method illustrated in FIG. 20 that performs the operations described herein is performed by computing hardware, for example, by one or more processors or computers, as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power transmission method comprising:
   operating a source resonator among a source resonators;
   detecting a waveform while the source resonator resonates;
   determining a source resonator for wireless power transmission based on an attenuation ratio of the detected waveform during discharging and a comparison of a shape of the detected waveform with other waveforms, wherein the attenuation ratio is a ratio of an amplitude of an envelope attenuation from an initial point in time to a predetermined point in time during a detection time, to an amplitude of the envelope at the initial point in time; and
   wirelessly transmitting power to a target resonator using the determined source resonator.

2. The wireless power transmission method of claim 1, wherein the operating comprises:
   supplying power to the source resonator during a first supply time; and
   disconnecting one end of the source resonator in response to the first supply time having elapsed.

3. The wireless power transmission method of claim 2, wherein the supplying comprises electrically connecting the source resonator to a direct current (DC) source during the first supply time; and
   the disconnecting comprises disconnecting an electrical connection between the source resonator and the DC source in response to the first supply time having elapsed.

4. The wireless power transmission method of claim 1, wherein the detecting comprises:
   detecting an envelope of an electric signal produced by resonance occurring in the source resonator during a detection time; and
   connecting both ends of the source resonator to a ground in response to the detection time having elapsed.

5. The wireless power transmission method of claim 1, wherein the wirelessly transmitting comprises:
   supplying power to the determined source resonator during a second supply time;
   disconnecting one end of the determined source resonator in response to the second supply time having elapsed; and
   connecting both ends of the determined source resonator to a ground in response to a transmission time having elapsed after a point in time at which the one end of the determined source resonator is disconnected.

6. The wireless power transmission method of claim 1, wherein the operating comprises:
   selecting the source resonator from the source resonators according to a preset order; and
   operating the selected source resonator; and
   the detecting comprises detecting waveforms for the source resonators in the preset order.

7. The wireless power transmission method of claim 6, wherein the source resonators are arranged in a lattice pattern; and
   the selecting comprises selecting a source resonator corresponding to a single row or a single column in the lattice pattern.

8. The wireless power transmission method of claim 5, wherein the source resonators are classified into groups; and
   the selecting comprises selecting a source resonator corresponding to a single group among the groups.

9. A non-transitory computer-readable storage medium storing instructions to cause computing hardware to perform the method of claim 1.

10. A wireless power transmission apparatus comprising:
    source resonators;
    a switch configured to operate a source resonator among the source resonators by connecting the source resonator to a power source;
    a detector configured to detect a waveform while the source resonator resonates; and
    a switch controller configured to:
    determine a source resonator for wireless power transmission based on an attenuation ratio of the detected waveform during discharging and a comparison of a shape of the detected waveform with other waveforms, wherein the attenuation ratio is a ratio of an amplitude of an envelope attenuated from an initial point in time to a predetermined point in time during a detection time to an amplitude of the envelope at the initial point in time, and control the switch to wirelessly transmit power to a target resonator using the determined source resonator.

11. The wireless power transmission apparatus of claim 10, wherein the switch comprises:
a first switch configured to selectively connect one end of each of source resonators connected together at the one end among the source resonators to the power source under control of the switch controller; and
a second switch configured to selectively connect another end of each of source resonators connected together at the other end among the source resonators to a ground under control of the switch controller.

12. The wireless power transmission apparatus of claim 10, wherein each of the source resonators comprises:
a capacitor;
an inductor; and
a diode configured to prevent power received by the source resonator from flowing to another one of the source resonators.

13. The wireless power transmission apparatus of claim 10, wherein the source resonators are arranged at intersection points at which parallel first axes intersect parallel second axes; and
the switch comprises:
a first switch configured to connect one end of each of source resonators arranged along a single first axis among the first axes to the power source; and
a second switch configured to connect one end of each of source resonators arranged along a single second axis among the second axes to a ground.

14. The wireless power transmission apparatus of claim 10, wherein source resonators having one end connected together among the source resonators are arranged in a zigzag pattern; and
source resonators having another end connected together among the source resonators are arranged in a line.

15. The wireless power transmission apparatus of claim 10, wherein the switch controller is further configured to:
control the switch to connect one end of the source resonator to the power source during a first supply time, and
disconnect the one end of the source resonator from the power source in response to the first supply time having elapsed.

16. The wireless power transmission apparatus of claim 10, wherein the detector is further configured to detect, at one end of the source resonator, an envelope of an electric signal produced by resonance occurring in the source resonator during a detection time; and
the switch controller is further configured to control the switch to connect both ends of the source resonator to a ground in response to the detection time having elapsed.

17. The wireless power transmission apparatus of claim 10, wherein the switch controller is further configured to:
control the switch to connect one end of the determined source resonator to the power source during a second supply time,
disconnect the one end of the determined source resonator from the power source in response to the second supply time having elapsed, and
connect both ends of the determined source resonator to a ground in response to a transmission time having elapsed after a point in time at which the one end of the determined source resonator is disconnected from the power source.

18. The wireless power transmission apparatus of claim 10, wherein the source resonators are classified into groups; and
the switch controller is further configured to:
sequentially select the groups,
control the switch to operate source resonators corresponding to a selected group, and
sequentially acquire waveforms for the source resonators.

19. A wireless power transmission apparatus comprising:
source resonators;
a switch configured to operate a source resonator among the source resonators by connecting the source resonator to a power source;
a detector configured to detect a waveform while the source resonator resonates; and
a switch controller configured to:
determine, based on the detected waveform, whether a target resonator forming resonance coupling with a source resonator is present based on an attenuation ratio of the detected waveform during discharging, wherein the attenuation ratio is a ratio of an amplitude of an envelope attenuated from an initial point in time to a predetermined point in time during a detection time to an amplitude of the envelope at the initial point in time, and
control the switch to wirelessly transmit power to the target resonator using the determined source resonator in response to the target resonator being preset, wherein the switch controller is further configured to determine whether the target resonator is present based on a comparison of a shape of the detected waveform with other waveforms, and to transmit power to a neighboring source resonator in response to the target resonator being determined not to be preset.

* * * * *